(12) United States Patent
Compton et al.

(10) Patent No.: US 11,704,680 B2
(45) Date of Patent: Jul. 18, 2023

(54) DETECTING FRAUDULENT USER ACCOUNTS USING GRAPHS

(71) Applicant: Oracle International Corporation, Redwood Shores, CA (US)

(72) Inventors: Christopher Ross Compton, Seattle, WA (US); Margaret Elizabeth Whorf, Kirkland, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/993,041

(22) Filed: Aug. 13, 2020

(65) Prior Publication Data

US 2022/0051264 A1    Feb. 17, 2022

(51) Int. Cl.
| | | |
|---|---|---|
| *G06Q 30/00* | (2023.01) | |
| *G06Q 30/018* | (2023.01) | |
| *G06F 16/901* | (2019.01) | |
| *G06N 5/04* | (2023.01) | |
| *G06Q 50/00* | (2012.01) | |
| *G06Q 30/0204* | (2023.01) | |
| *G06F 21/64* | (2013.01) | |

(52) U.S. Cl.
CPC ..... *G06Q 30/0185* (2013.01); *G06F 16/9024* (2019.01); *G06F 21/64* (2013.01); *G06N 5/04* (2013.01); *G06Q 30/0205* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 10,152,557 B2 | 12/2018 | Banadaki et al. | |
| 2018/0255088 A1* | 9/2018 | Cazin | G06Q 20/4016 |
| 2020/0065814 A1* | 2/2020 | Fang | G06Q 20/4014 |
| 2020/0349586 A1* | 11/2020 | Deng | G06Q 30/0185 |
| 2021/0218760 A1* | 7/2021 | Lee | H04L 63/1416 |

* cited by examiner

*Primary Examiner* — Meredith A Long
(74) *Attorney, Agent, or Firm* — Kilpatrick Townsend & Stockton LLP

(57) ABSTRACT

A fraud detection system is disclosed that detects potential fraudulent behavior associated a user account by identifying attributes of the user account that share attributes with one or more known fraudulent user accounts. The set of shared attributes for a user account are identified by constructing a bipartite graph comprising a set of user account nodes and a set of attribute nodes associated with the set of user account nodes. A match score for the user account is computed based on the set of shared attributes. Actions to be taken for the user account are identified based on the match score. The actions may include tagging the user account as potentially fraudulent. The actions can be used by a user (e.g., an administrator) of an organization to more intelligently determine appropriate measures to be taken for the potentially fraudulent user account.

19 Claims, 9 Drawing Sheets

DETECTING FRAUDULENT USER ACCOUNTS USING GRAPHS

TECHNICAL FIELD

This disclosure relates generally to fraud detection systems. More specifically, but not by way of limitation, this disclosure describes a fraud detection system that detects potential fraudulent behavior associated with a user account based on attributes associated with the user account.

BACKGROUND

Online fraud continues to be a huge problem is today's distributed computing environment. The scope for online fraud has dramatically increased with the rising popularity of cloud-based services. It is a serious issue for both consumers of cloud-based services and for providers of cloud-based services.

Fraud detection involves the identification of fraudsters in a distributed network environment, such as the Internet, so that the suspected fraudsters can be prevented from causing damage, for example, by denying them access to valuable resources within the network. Detecting fraudsters in an online environment is however a very difficult and challenging task. Fraud detection techniques typically try to identify potential fraudsters based upon past actions of users. Many conventional fraud detection systems use rules to identify fraudsters, where the rules are based on past behaviors of the users, such as based upon events that have been previously characterized and/or classified as being fraudulent. However, these rule-based systems are static in nature and easily circumvented by experienced fraudsters who constantly change their behavior patterns to avoid detection. More recently, some artificial intelligence (AI) and machine learning (ML) based models have been used to detect fraudulent behavior. However, the supervised ML based models need a large amount of training data for training a model, and such data is not easily available. As a result, the models resulting from this reduced training data set are not very accurate, too specific, or biased in nature. Further, given the dynamic nature of the behavior of fraudsters, even the ML models are many times inadequate for providing strong and reliable fraud detection.

SUMMARY

This disclosure relates generally to fraud detection systems. More specifically, but not by way of limitation, this disclosure describes a fraud detection system that detects potential fraudulent behavior associated with a user account based on attributes associated with the user account.

In certain embodiments, a fraud detection system is disclosed that performs a method for detecting potentially fraudulent user account. The method includes accessing a graph comprising a set of nodes. The set of nodes include user account nodes and attribute nodes. Each user account node in the set of user account nodes represents a user account. Each attribute node in the set of attribute nodes represents an attribute characterized by an attribute name and a value associated with the attribute name. Each node in the set of user account nodes is connected via one or more edges to one or more attribute nodes from the set of attributes nodes. The set of attribute nodes represent one or more attributes that are associated with the user account represented by the user account node. The set of user account nodes comprise a set of one or more fraudulent user account nodes corresponding to one or more user accounts known as being fraudulent. The set of user account nodes further comprise a set of one or more monitored user account nodes corresponding to one or more user accounts being monitored.

In certain embodiments, the method includes, for a first monitored user account node in the set of monitored user account nodes, identifying a set of one or more shared attribute nodes from the set of attribute nodes. Each attribute node in the set of shared attribute nodes is connected via edges to both the first monitored user account node and to at least one fraudulent user account node from the plurality of fraudulent user account nodes.

The method further includes computing a match score for the first monitored user account node based on the set of shared attribute nodes and determining, based upon the match score computed for the first monitored user account node, that a first monitored user account corresponding to the first monitored user account node is potentially a fraudulent user account. The method includes responsive to the determining, identifying an action to be performed with respect to the first monitored user account corresponding to the first monitored user account node and performing the action.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
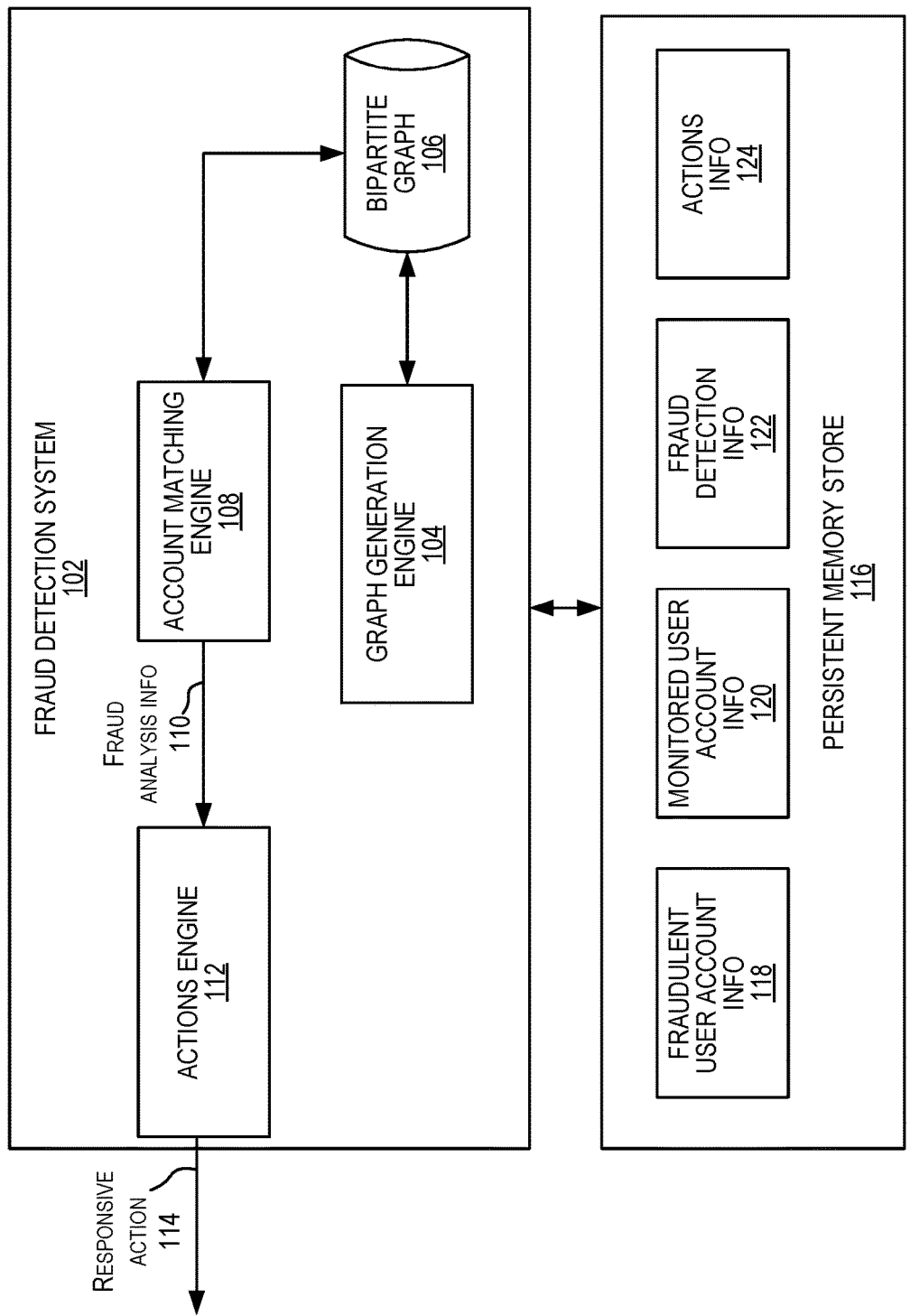
FIG. 1 depicts an example computing environment including a fraud detection system (FDS) that includes capabilities for identifying potential fraudulent user accounts within one or more organizations, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

In certain embodiments, a fraud detection system is disclosed that detects potential fraudulent behavior associated with user accounts based on attributes associated with the user accounts. The fraud detection system uses graph-based techniques to identify suspected fraudulent behavior. In certain embodiments, the fraud detection system builds a graph to represent user accounts and their associated attributes, where the user accounts include accounts that are known to be fraudulent (fraudulent user accounts) and other user accounts whose behavior is being monitored (monitored user accounts) by the fraud detection system. For each user account being monitored, the fraud detection system keeps track of the attributes that are common to that monitored user account and to one or more known fraudulent user accounts. Based upon these common or shared attributes, the fraud detection system computes a match score for the user account. The fraud detection system may identify a particular monitored user account as being potentially fraudulent based upon the match score associated with that monitored user account. For example, a monitored user account may be identified as possibly being a fraudulent user account when the match score computed for that user account matches or exceeds a threshold. The fraud detection system may trigger one or more actions when such a potential fraudulent user account is detected.

The fraud detection system described herein is very flexible and dynamic in nature. The user accounts, including the known fraudulent user accounts and the monitored user accounts, can change dynamically. For example, new user accounts may be identified as fraudulent user accounts, new user accounts can be added for monitoring, user accounts can be deleted, and the like. The attributes associated with the user accounts can also change dynamically. Examples of attributes associated with a user account include without limitation, a name or other identification information (e.g., user name, email address) associated with the account, geographical information (e.g., zip code, state, city, address) associated with the account, a network address associated with the account (e.g., an IP or MAC address of a device used to set up the account or a device commonly used by the account holder), device information associated with the account (e.g., a geolocation code of the device), financial information associated with the account (e.g., credit card information used to set up the account), and other information (e.g., a delivery location associated with the account, so on. Further, the number and types of attributes known for one user account can be different from the number and types of attributes known for another user accounts. The fraud detection system updates the graph to reflect the dynamic changes. This enables the fraud detection system to perform fraud detection in a completely dynamic manner.

As indicated above, the fraud detection system uses a graph to perform fraud detection where the graph comprises nodes and edges between the nodes. In certain examples, the fraud detection system constructs and uses a bipartite graph A bipartite graph consists of two disjoint sets of nodes. A bipartite graph, as used herein, refers to a graph whose nodes can be divided into two disjoint and independent sets, U and V, such that every edge in the graph connects a node in set U to a node in set V, and where no two graph nodes within the same set are adjacent (i.e., no two graph nodes from the same set are connected by an edge). In a certain implementation, the two disjoint sets of nodes (U, V) in the bipartite graph comprise nodes representing user accounts (referred to herein as user account nodes) (set U) and nodes representing attributes (referred to herein as attribute nodes) (set V). The user account nodes include nodes representing known fraudulent user accounts (referred to herein as fraudulent user account nodes) and nodes representing user accounts that are being monitored by the fraud detection system for fraudulent activity (referred to herein as monitored user account nodes). Due to nature of the bipartite graph, a user account node is connected by one or more edges to one or more attribute nodes. A user account node is not connected to another user account node. Likewise, an attribute node can be connected via one or more edges to one or more user account nodes, but is not connected to another attribute node.

Each attribute node in the graph represents an attribute, where the attribute comprises two parts: an attribute name and an associated attribute value. Each attribute node in the bipartite graph representing an attribute contains a single key-value pair, where the key identifies an attribute name and the value identifies an attribute value associated with the attribute name. Examples of key-value pairs (attribute name-attribute value pairs) in the attribute nodes may include, for instance:

Attribute node #1: username (key)=John Nice (value)
Attribute node #2: zipcode (key)=95008 (value)
Attribute node #3: zipcode (key)=95106 (value)
Attribute node #4: username (key)=John Nice (value)

In certain embodiments, for a certain key-value pair, the bipartite graph contains only one attribute node. Accordingly, no two attribute nodes in bipartite graph have the same key-value pair. Two (or more) attribute nodes in the graph can have the same key but different associated value. Thus, there are no duplicate attributes in the graph.

In certain examples, for each monitored user account represented by a monitored user account node in the graph, the fraud detection system keeps track of the attributes that are common to that monitored user account and to one or more known fraudulent user accounts. For example, both a monitored user account and a fraudulent user account may share or have a common attribute such as <zipcode=95008>. Based upon such common or shared attributes for a monitored user account, the fraud detection system computes a match score for the monitored user account. If the computed match score is greater than a preconfigured threshold value, the fraud detection system determines that the monitored user account exhibits potentially fraudulent characteristics and may identify the particular monitored user account as such. Once a match has been identified as being potentially fraudulent, the fraud detection system may identify one or more actions to be performed for that monitored user account. Examples of actions may include, for instance, tagging the monitored user account as potentially fraudulent, communicating a message to an administrator of an organization indicating that the particular monitored user account is a potentially fraudulent user account, restricting access to one or more resources by the particular monitored user account, imposing stricter policies (e.g., authentication or authorization requirements) to limit the scope of activity that can be performed by the particular monitored user account (e.g., requiring a user associated with the monitored user account to re-authenticate go through additional email and phone verification steps, etc.), quarantining the monitored user account, and so on.

The fraud detection system described in the present disclosure provides several technical advancements over conventional fraud detection systems. The fraud detection system described herein is very flexible and dynamic in nature. The user accounts, including the known fraudulent user accounts and the monitored user accounts, can change dynamically. For example, new user accounts may be identified as fraudulent user accounts, new user accounts can be added for monitoring, user accounts can be deleted, and the like. The attributes associated with the user accounts can also change dynamically. The number and types of attributes known for one user account can be different from the number and types of attributes known for other user accounts. The fraud detection system updates the graph to reflect the dynamic changes. This enables the fraud detection system to perform fraud detection in a completely dynamic manner. The fraud detection system described herein is not encumbered by static specific attribute-based rules. The attribute matching is performed by the fraud detection system in a manner that accounts and compensates for the possibly changing behavior pattern of a known fraudster. Unlike AI/ML based techniques, there is no training data or training required. The fraud detection system automatically adapts to information available about user accounts. Due to its adaptability, the fraud detection system is easy to administer and use. Additionally, the fraud detection system described in this disclosure enables the detection of potentially fraudulent user accounts based on all the varied pieces of information known about the user account rather than just based upon prior actions performed by a user of the user account. The attribute matching and match score computation techniques describes herein provide a mechanism for repeatable and reliable fraud detection in various different situations. A graph, such as a bipartite graph, provides a memory efficient way of representing and using user accounts and attributes information. Additionally, the fraud detection system described herein can automatically identify actions to be performed for a monitored user account that has been identified as potentially fraudulent. The actions can be used by a user (e.g., an administrator) of an organization to more intelligently determine appropriate measures to be taken for the potentially fraudulent user account.

Referring now to the drawings, FIG. 1 depicts an example computing environment 100 including a fraud detection system (FDS) 102 that includes capabilities for identifying potential fraudulent user accounts within one or more organizations, according to certain embodiments. In the embodiment depicted in FIG. 1, FDS 102 includes several systems and subsystems or engines including a graph generation engine 104, an account matching engine 108, and an actions engine 112. The systems and subsystems depicted in FIG. 1 may be implemented using only software (e.g., code, instructions, program) executed by one or more processing units (e.g., processors, cores), only hardware, or combinations thereof. The software may be stored on a non-transitory storage medium (e.g., on a memory device). Portions of data or information used by or generated by FDS 102 as part of its processing may be stored in a persistent memory store 116. The computing environment 100 depicted in FIG. 1 is merely an example and is not intended to unduly limit the scope of claimed embodiments. One of ordinary skill in the art would recognize many possible variations, alternatives, and modifications. For example, in some implementations, FDS 102 can be implemented using more or fewer subsystems than those shown in FIG. 1, may combine two or more subsystems, or may have a different configuration or arrangement of subsystems.

FDS 102 may be implemented in various different configurations. In certain embodiments, FDS 102 may be provided as a fraud detection system within an enterprise servicing users of the enterprise. In some other embodiments, FDS 102 may be implemented on one or more servers of a cloud provider and its fraudulent account detection functionality may be provided to subscribers of cloud services on a subscription basis.

In certain examples, information related to various accounts may be stored in persistent memory store 116. This information may include information 118 related to one or more fraudulent user accounts and information 120 related to one or more monitored user accounts 120. A fraudulent user account is a user account that is identified as being fraudulent. For instance, a fraudulent user account is an user account that is known to be used for performing fraudulent activities. Accordingly, for each fraudulent user account, information 118 may contain information indicating that the user account is fraudulent. In certain embodiments, information identifying certain user accounts as being fraudulent may be configured by a system administrator. Fraudulent user account information 118 may be stored in a memory location local to fraud detection system 102, or may be stored in a memory location remote from the fraud detection system 102 and accessible via one or more communication networks, or in a combination of local and remote locations. In some instances, information 118 regarding fraudulent user accounts may be made available by a third party or a service provider that is tasked with providing such information.

For the fraudulent user accounts, fraudulent user accounts information 118 may, for each fraudulent user account, identify one or more attributes associated with the fraudulent user account. One or multiple attributes may be associated with a fraudulent user account. As previously described, each attribute includes an attribute name and an associated attribute value. The number and types of attributes for one fraudulent user account may be the same as or different from the attributes for another fraudulent user account in the set of fraudulent user accounts.

Monitored user accounts represent user accounts that are being monitored and tracked by FDS 102 for fraudulent activity. For example, in an enterprise environment, the monitored user accounts may represent the user accounts of users or members of the enterprise. As another example, when the fraud detection functionalities of FDS 102 are being provided as cloud services, for a subscriber subscribing to this service, the monitored user accounts may represent user accounts identified by the subscriber to be monitored.

For the monitored user accounts, monitored user accounts information 120 may, for each monitored user account, identify one or more attributes associated with the monitored user account. One or multiple attributes may be associated with a monitored user account. As previously described, each attribute includes an attribute name or type and an associated attribute value. The number and types of attributes for one monitored user account may be the same as or different from the attributes for another monitored user account in the set of fraudulent user accounts. Accordingly, the attributes associated with the different monitored user accounts can differ enhancing the adaptability of FDS 102. A monitored user account may share zero, a subset, or all attributes associated with one or more fraudulent user accounts.

The attributes associated with the fraudulent user accounts and monitored user accounts can be of various different types. For example, the user account attributes may include attributes such as, a name or other identification information (e.g., user name, email address) associated with the account, geographical information (e.g., zip code, state, city, address) associated with the account, a network address associated with the account (e.g., an IP or MAC address of a device used to set up the account or a device commonly used by the account holder), device information associated with the account (e.g., a geolocation code of the device), financial information associated with the account (e.g., credit card information used to set up the account), and other information (e.g., a delivery location associated with the account, so on.

In certain embodiments, FDS 102 is configured to build a graph based upon information stored in fraudulent user account information 118 and monitored user account information 120 and uses the graph to identify one or more of the monitored user accounts as being potentially fraudulent user accounts. For example, in the embodiment depicted in FIG. 1, FDS 102 constructs a bipartite graph 106 based upon fraudulent user accounts information 118 and monitored user accounts information 120. The bipartite graph 106 may be constructed in a system memory (e.g., RAM) of a computer system implementing FDS 102. Further details related to the construction of the graph and its structure are described below.

FDS 102 then uses the graph 106 to detect and identify one or more of the monitored user accounts as potentially being fraudulent. In certain embodiments, for each monitored user account, FDS 102 keeps track of attributes that are common to that monitored user account and to one or more fraudulent user accounts. Based upon these common or shared attributes, the fraud detection system computes a match score for the monitored user account. The fraud detection system may then identify a particular monitored user account as being potentially fraudulent based upon the match score associated with that monitored user account. For example, a monitored user account may be identified as possibly being fraudulent when the match score computed for that monitored user account matches or exceeds a threshold.

Once FDS 102 determines that a particular monitored user account exhibits potentially fraudulent characteristics, FDS 102 may then identify a set of one or more actions to be performed for that particular monitored user account. Examples of actions may include, for instance, tagging the particular monitored user account as potentially fraudulent, communicating a message to an administrator of an organization indicating that the particular monitored user account is a potentially fraudulent user account, imposing stricter policies to limit activities that can be performed or resources that can be accessed using the particular monitored (e.g., requiring a user associated with the particular user account to go through authentication or authorization steps), quarantining the user account, and so on.

In certain embodiments, information may be configured for FDS 102 that the FDS 102 uses in its processing for identifying potentially fraudulent monitored user accounts and subsequently for triggering one or more actions after a monitored user account has been identified as being potentially fraudulent. This information may be configured by a system administrator. As shown in the embodiment depicted in FIG. 1, fraud detection information 122 may be configured that is used by FDS 102 to compute match scores for the monitored user accounts and to identify, based upon the match scores, one or more monitored user accounts as being potentially fraudulent. In certain embodiments, actions information 124 may also be configured for FDS 102 that is used by FDS 102 to determine one or more actions to be performed or initiated when a particular monitored user account has been identified as being potentially fraudulent.

Figure 2:
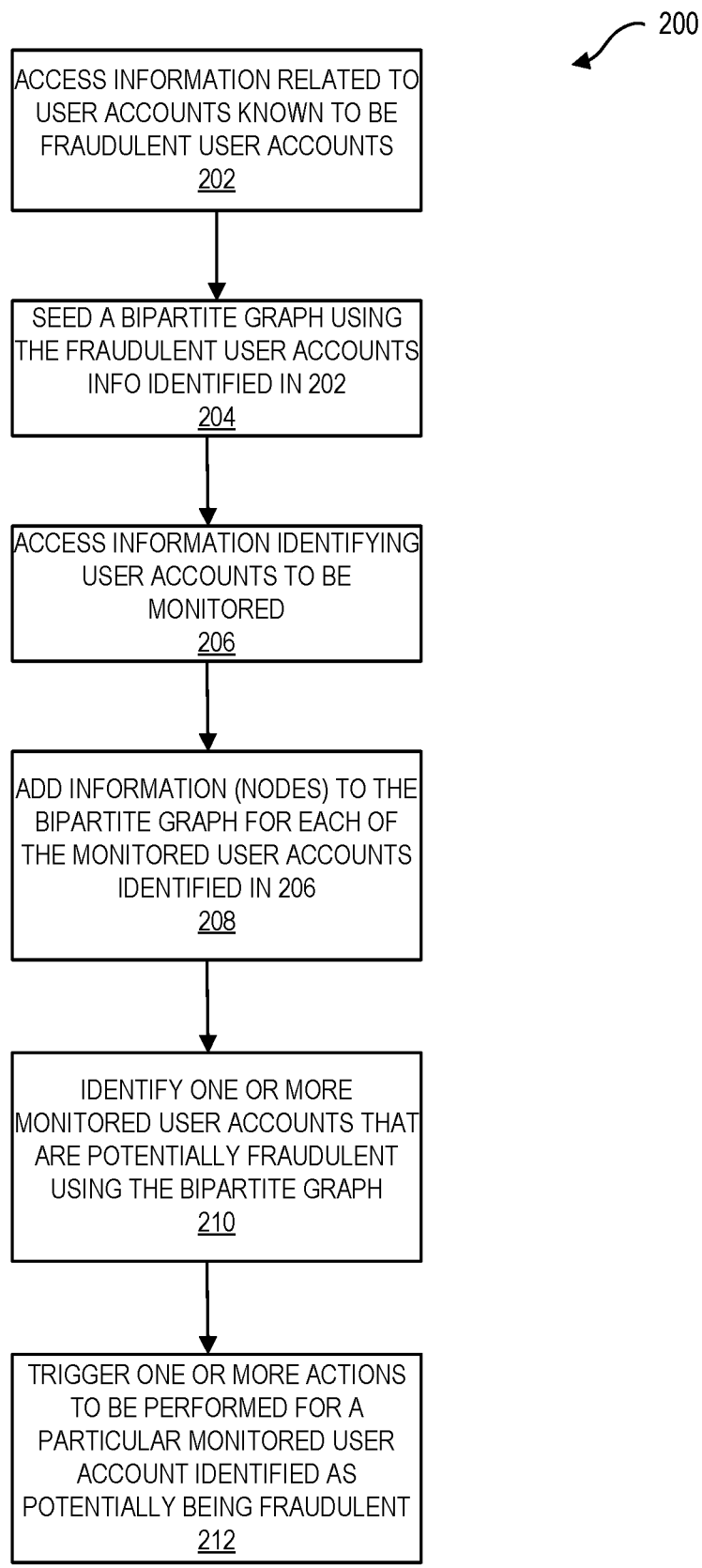
FIG. 2 depicts an example of a process for generating and using a bipartite graph to detect potentially fraudulent monitored user accounts according to certain embodiments.

Details related to the processing performed by FDS 102 are described below. FIG. 2 depicts an example of a process 200 for generating and using a bipartite graph to detect potentially fraudulent monitored user accounts according to certain embodiments. The processing depicted in FIG. 2 may be implemented in software only (e.g., code, instructions, program) executed by one or more processing units (e.g., processors, cores) of the respective systems, hardware only, or combinations thereof. The software may be stored on a non-transitory storage medium (e.g., on a memory device). The process 200 presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing in 202, 204, 206, and 208 is performed by graph generation engine 104 of FDS 102, the processing in block 210 is performed by account matching engine 108 of FDS 102, and the processing in block 212 is performed by actions engine 112 in FDS 102.

In certain embodiments, processing is initiated at block 202 when graph generation engine 104 accesses information related to user accounts known to be fraudulent user accounts. For example, graph generation engine 104 may access fraudulent accounts information 118 shown in FIG. 1.

At block 204, graph generation engine 104 seeds a bipartite graph using the fraudulent user accounts information accessed in block 202. As part of the processing in 204, FDS 102 adds nodes to the bipartite graph to represent the fraudulent user accounts and their attributes and adds edges to the bipartite graph to represent associations between a node representing a fraudulent user account and nodes representing the fraudulent user account's attributes. Details related to the processing performed by graph generation engine 104 for seeding a bipartite graph using fraudulent user accounts information is described below with respect to the process for adding nodes and edges to a bipartite graph for user accounts, in general, and their attributes, depicted in FIG. 3 and its accompanying description.

At block 206, graph generation engine 104 accesses information identifying user accounts to be monitored. For instance, for the embodiment depicted in FIG. 1, graph generation engine 104 may access monitored user accounts information 120 stored in persistent memory store 116.

At block 208, graph generation engine 104 adds information (i.e., nodes) to the bipartite graph generated in 204 for each of the monitored user accounts for which information is accessed in block 206. As part of the processing in

208, FDS 102 adds nodes to the bipartite graph to represent the monitored user accounts and their attributes and adds edges to the bipartite graph to represent associations between a node representing a monitored user account and nodes representing the monitored user account's attributes. Details related to the processing performed by graph generation engine 104 for adding nodes to the bipartite graph for the monitored user accounts is described below with respect to the process depicted in FIG. 3 and its accompanying description.

At block 210, accounts matching engine 108 uses the bipartite graph generated by graph generation engine 104 to identify one or more monitored user accounts that potentially could be fraudulent. As part of the processing performed in 210, account matching engine 108 may, using the bipartite graph generated by the graph generation engine 104, identify, for each monitored user account, a set of attribute nodes that are shared by the monitored user account and one or more fraudulent user accounts. A shared attribute node is one where the node representing the attribute is connected to both the node representing the monitored user account and to a node (or nodes) representing a fraudulent user account. Based upon the number of shared attribute nodes, a match score may be computed for the monitored user account by the account matching engine 108 in 210. A monitored user account may be identified as a potentially fraudulent user account if the match score computed for the monitored user account equals or exceeds some preconfigured threshold value.

At block 212, for a particular monitored user account identified as potentially being fraudulent by account matching engine 108, actions engine 112 may cause or trigger one or more actions to be performed for the particular monitored user account identified as potentially being fraudulent.

Figure 3:
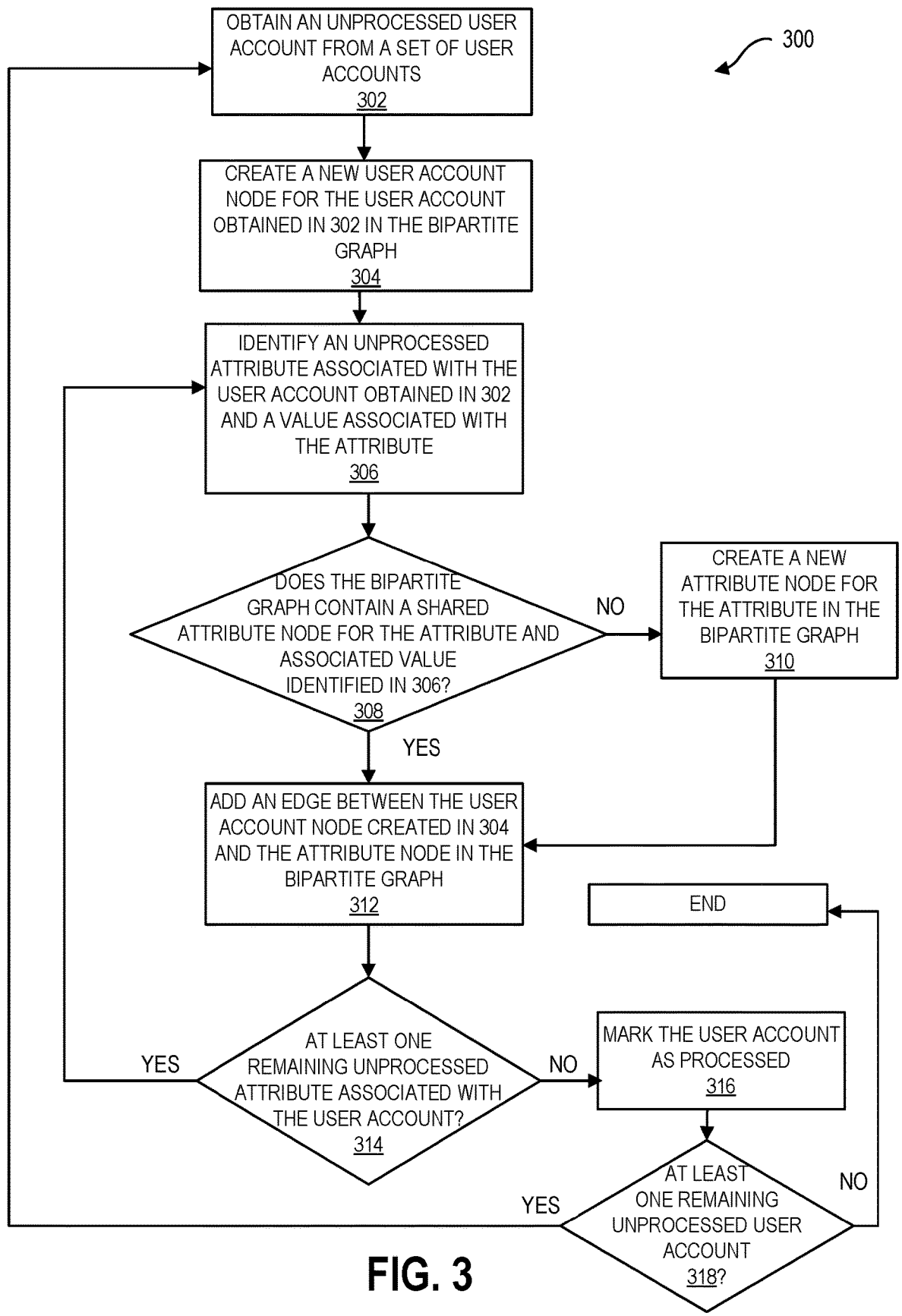
FIG. 3 depicts an example of a process for adding nodes and edges to a bipartite graph for user accounts, in general, and their attributes, according to certain embodiments, where the user account can be a fraudulent user account or a monitored user account.

In the flowchart depicted in FIG. 2 and describe above, the bipartite graph is first seeded with fraudulent user accounts information and then supplemented with monitored user accounts information. This order of processing is however not intended to be limiting. In some other embodiments, the adding of nodes and edges can be interspersed for fraudulent user accounts and monitored user accounts. For example, FIG. 3 depicts an example of a process 300 for adding nodes and edges to a bipartite graph for user accounts, in general, and their attributes, according to certain embodiments, where the user account can be a fraudulent user account or a monitored user account. Accordingly, FIG. 3 and the accompanying description is provided in terms of a user account, where the user account can be a fraudulent user account or a monitored user account.

The processing depicted in FIG. 3 may be implemented in software only (e.g., code, instructions, program) executed by one or more processing units (e.g., processors, cores) of the respective systems, hardware only, or combinations thereof. The software may be stored on a non-transitory storage medium (e.g., on a memory device). The process 300 presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 3 may be performed by graph generation engine 104 of FDS 102. For example, the processing depicted in FIG. 3 and described below may be performed in block 204 and block 208 of FIG. 2.

At the start of the processing, all the user accounts are marked or considered as being unprocessed. In the embodiment depicted in FIG. 3, processing is initiated at block 302 when graph generation engine 104 accesses information for an unprocessed user account. For example, the graph generation engine 104 may read information for an unprocessed fraudulent user account from fraudulent user account information 118 or may read information for an unprocessed monitored user account from monitored user accounts information 120. As part of the processing in 302, graph generation engine 104 reads information identifying a user account and also attributes of the user account, where each attribute identifies an attribute name and its associated attribute value.

At block 304, graph generation engine 104 creates a new user account node for the user account obtained in block 302 and adds the node to the bipartite graph. For example, if a fraudulent user account is read in 302, then a node (referred to as a fraudulent user account node) representing the fraudulent user account is added to the bipartite graph. If a monitored user account is read in 302, then a node (referred to as a monitored user account node) representing the monitored user account is added to the bipartite graph.

For the processing depicted in 302 in FIG. 3, it is assumed that the bipartite graph is being built from scratch (e.g., the graph is empty to start out with). In embodiments, where a bipartite graph has previously been built, a check may be first made to see if a node already exists for the user account read in 302, and a new node is added only if the bipartite graph does not already contain a node for the read user account.

The processing in 306, 308, 310, 312, and 314 then adds nodes and edges corresponding to the attributes of the user account read in 302. At block 306, graph generation engine 104 identifies an unprocessed attribute associated with the user account read in block 302 and for which a user account node has been added in 304. Each attribute associated with a user account contains a tuple of elements (Attribute Name, Attribute Value) including an attribute name and attribute value associated with the attribute name. For instance, an attribute for a zip code may be represented as ("zip code", "95121"), or <zip code=95121>.

At block 308, a check is made by graph generation engine 104 to see if the bipartite graph already contains an attribute node corresponding to or matching the unprocessed attribute selected in 306 for processing. In order for an attribute node in the bipartite graph to match the unprocessed attribute identified in 306, both the attribute name and the associated attribute value represented by the attribute node have to match the attribute name and the attribute value for the attribute selected in 306. For example, if the attribute identified in 306 is <zip code=95121>, then an attribute node in the bipartite graph is considered a matching attribute node if the attribute represented by the attribute node is also <zip code=95121>. As an example, an attribute node in the bipartite graph representing <zip code=95113> is not a matching attribute node.

If it is determined in 308 that the bipartite graph already includes a matching attribute node for the attribute identified in 306, at block 312, graph generation engine 104 creates an edge between the user account node created in block 304 and the attribute node in the bipartite graph identified as being matched. In this manner, for a given attribute, there is only one attribute node in the bipartite graph corresponding to or representing that attribute. If multiple user accounts have the same attribute, then nodes representing those user accounts each have an edge to the one attribute node representing that attribute. For example, if there are multiple user accounts having the <zip code=95121> attribute, the user account nodes in the bipartite graph representing the multiple user accounts each have an edge to the attribute node representing <zip code=95121>.

If it is determined in block 308 that there is no matching attribute node for the attribute identified in block 306, then in block 310, graph generation engine 104 creates a new attribute node for the attribute identified in 306 and adds the new attribute node to the bipartite graph in block 312 by creating an edge between the user account node created in block 304 and the new attribute node created in 310.

At block 314, graph generation engine 104 checks if there is at least one remaining unprocessed attribute associated with the user account read in 302. If it is determined in 314 that all attributes have been processed, then, in block 316, graph generation engine 104 marks the user account read in 302 as processed and proceeds with the processing in block 318. If it is determined in 314, that there is at least one remaining unprocessed attribute, then the processing loops back to block 306 wherein the next unprocessed attribute is selected or identified for processing and processing continues with blocks 308, 310, 312, and 314 for the newly selected unprocessed attribute associated with the user account.

At block 318, graph generation engine 104 checks if there is at least one remaining unprocessed user account. If there is at least one remaining unprocessed user account, the processing loops back to block 302 to obtain and read information about the next unprocessed user account. If it is determined in 318 that there all user accounts have been processed, then process ends. As a result of the processing performed in FIG. 3, graph generation engine 104 constructs and outputs a bipartite graph comprising user account nodes representing fraudulent user accounts and monitored user accounts and attribute nodes representing attributes associated with the user accounts.

Figure 4:
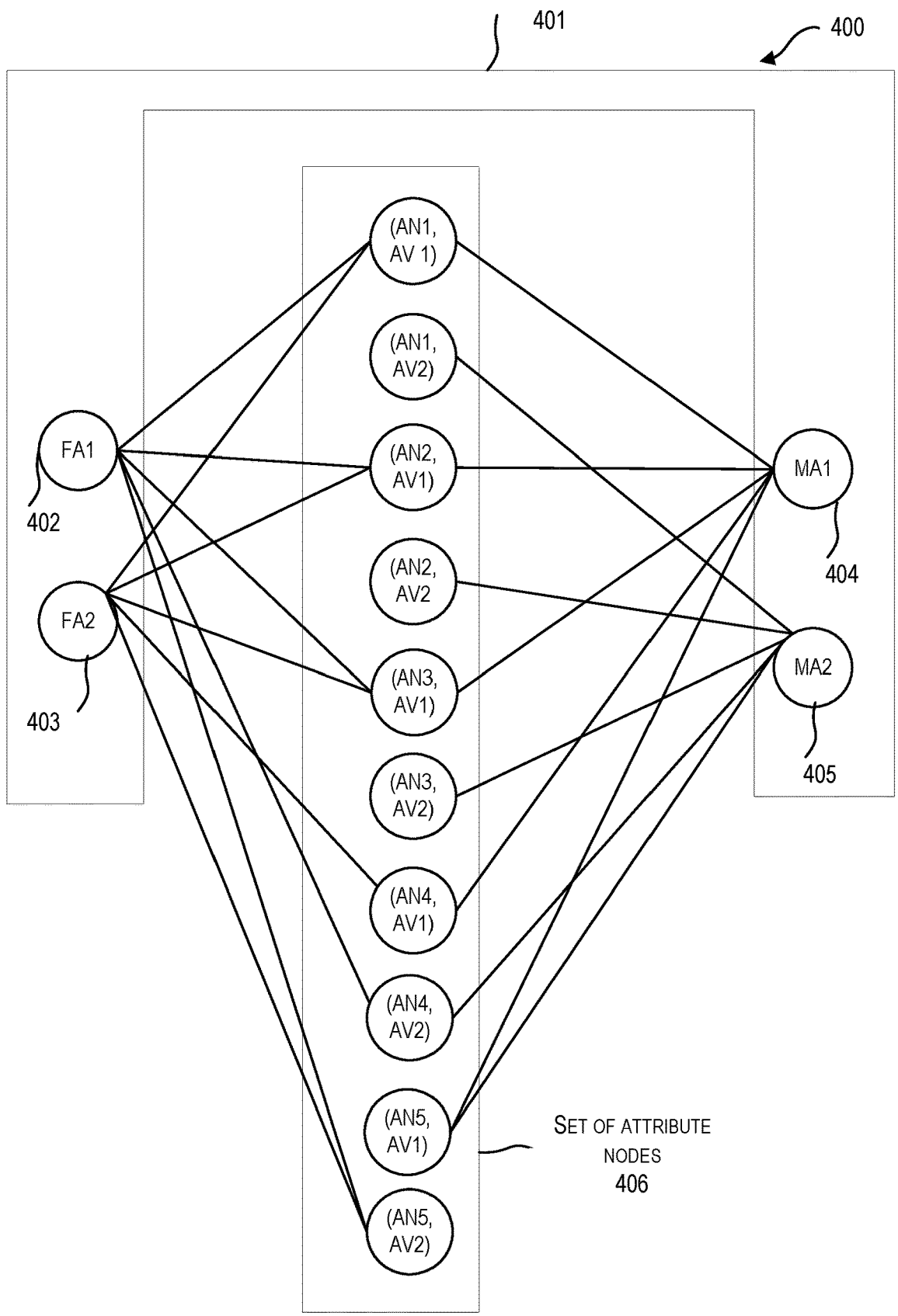
FIG. 4 is one example of a bipartite graph generated by the fault detection system (FDS) of FIG. 1 for identifying potentially fraudulent accounts, according to certain embodiments.

FIG. 4 is one example of a bipartite graph generated by the fault detection system (FDS) of FIG. 1 for identifying potentially fraudulent accounts, according to certain embodiments. In certain embodiments, bipartite graph 400 may be generated by graph generation engine 104 of FDS 102 using the processing depicted in FIGS. 2 and 3 and described above. Bipartite graph 400 comprises two sets of disjoint and independent nodes, namely, a set of user account nodes 401 representing user accounts and a set of attribute nodes 406 representing attributes. The set of user account nodes 401 comprise a set of one or more fraudulent user account nodes (402, 403) representing fraudulent user accounts and a set of one or more monitored user account nodes (404, 405) representing monitored user accounts being monitored by FDS 102. In the example of bipartite graph 400 depicted in FIG. 4, the set of fraudulent user account nodes comprises fraudulent user account nodes, FA1 and FA2 and the set of monitored user account nodes comprises monitored user account nodes, MA1 and MA2. In bipartite graph 400, a user account node is connected to an attribute node if the attribute represented by the attribute node is associated with the user account represented by the user account node. Accordingly, a node representing a user account can have edges to one or more attribute nodes representing attributes. However, a user account node is not connected via an edge to another user account node.

Each attribute node in the set of attribute nodes 406 represents an attribute, where the attribute comprises an attribute name (AN) and an associated attribute value (AV). Each attribute node thus represents a tuple (AN, AV). In certain examples, there is only one instance of an attribute in the bipartite graph. Accordingly, no two attribute nodes in bipartite graph 400 have the same attribute name and associated attribute value. Two attribute nodes may share the same attribute but have different associated attribute values. For instance, a first attribute node may represent attribute (AN1, AV1) and another separate attribute node may represent attribute (AN1, AV2) having the same attribute name (e.g., zip code) but with different associated attribute values, AV1 and AV2 (e.g., "95121" and "94025") respectively.

As depicted by the example of bipartite graph 400 in FIG. 4, for a user account node representing a user account, which may be a fraudulent user account or a monitored user account, attributes associated with that user account are represented by corresponding attribute nodes and are connected via edges to the user account node representing the user account. For instance, in the embodiment depicted in FIG. 4, a monitored user account MA1 has associated attributes (AN1, AV1), (AN2, AV1), (AN3, AV1), (AN4, AV1), (AN5, AV1). Accordingly, in bipartite graph 400, node 404 representing MA1 is connected via edges to attribute nodes representing attributes (AN1, AV1), (AN2, AV1), (AN3, AV1), (AN4, AV1), and (AN5, AV1). Likewise, monitored user account MA2 has attributes (AN1, AV2), (AN2, AV2), (AN3, AV2), (AN4, AV2), and (AN5, AV1). Accordingly, in bipartite graph 400, node 405 representing MA2 is connected via edges to attribute nodes representing (AN1, AV2), (AN2, AV2), (AN3, AV2), (AN4, AV2), and (AN5, AV1). Fraudulent user account FA1 has attributes (AN1, AV1), (AN2, AV1), (AN3, AV1)), (AN4, AV2), (AN5, AV2) and fraudulent user account, FA2 has attributes (AN1, AV1) (AN2, AV1), (AN3, AV1)), (AN4, AV1), (AN5, AV2). Accordingly, in bipartite graph 400, node 402 representing FA1 is connected via edges to attribute nodes representing attributes (AN1, AV1), (AN2, AV1), (AN3, AV1)), (AN4, AV2), and (AN5, AV2), and node 403 representing FA2 is connected via edges to attribute nodes representing (AN1, AV1) (AN2, AV1), (AN3, AV1)), (AN4, AV1), (AN5, AV2). For an attribute that is common to or is shared between two user accounts (fraudulent user accounts or monitored user accounts), both the nodes representing the two user accounts are connected by edges to that same attribute node representing the shared attribute. For example, attribute (AN5, AV1) is shared by monitored user account MA1 and MA2 and so the attribute node representing (AN5, AV1) is connected by edges to monitored user account nodes 404 and 405 via edges. As another example, attribute (AN2, AV1) is shared by user accounts FA1, FA2, and MA1, and so the attribute node representing (AN2, AV1) is connected by edges to nodes corresponding to user accounts FA1, FA2, and MA1.

Bipartite graph 400 depicted in FIG. 4 is an example and is not intended to be limiting in any manner. The user account nodes, including fraudulent account nodes and monitored account nodes, and the attribute nodes shown in bipartite graph 400 are for illustrative purposes only and are not intended to be restrictive or limiting. In alternate embodiments, bipartite graph 400 can have more or fewer user account nodes and more or fewer attribute nodes with different edges between the user account nodes and attribute nodes.

Figure 5:
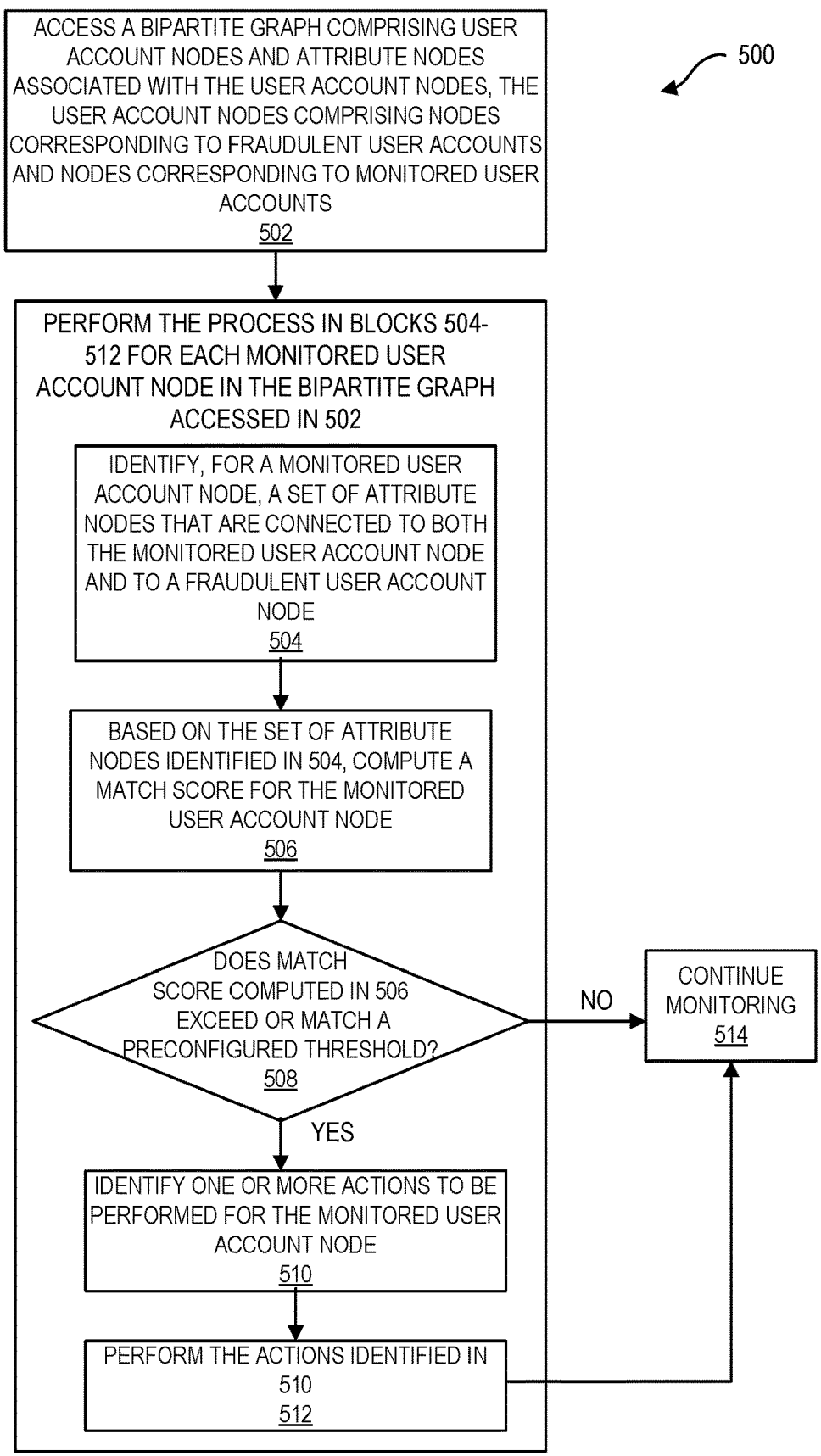
FIG. 5 is an example of a process for identifying potentially fraudulent accounts and initiating one or more responsive actions, according to certain embodiments.

FIG. 5 is an example of a process 500 for identifying potentially fraudulent accounts and initiating one or more responsive actions, according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 500 presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, the processing in blocks 502, 504, 506, 508, and 514 may be performed by account matching engine 108 depicted of FDS 102 in FIG. 1, and the processing in blocks 510 and 512 may be performed by actions engine 112.

In certain embodiments, the processing in FIG. 5 is initiated at block 502 when account matching engine 108 accesses a bipartite graph (e.g., 400) comprising a set of user account nodes representing user accounts and a set of attribute nodes representing attributes associated with the user account nodes. The set of user account nodes may include one or more fraudulent user account nodes representing one or more fraudulent user accounts and one or more monitored user account nodes representing one or more monitored user accounts.

Account matching engine 108 then performs the processing depicted in blocks 504-512 for each monitored user account node in the bipartite graph accessed in block 502. For example, at block 504, for a particular monitored user account node representing a particular monitored user account, account matching engine 108 identifies a set of attribute nodes that are connected to the monitored user account node and to one or more fraudulent user account nodes representing one or more fraudulent user accounts. This set of attribute nodes represent attributes that are shared by or are common to the particular monitored user account represented by the monitored user account node and one or more fraudulent user accounts. If the set identified in 504 contains one or more attribute nodes, these nodes may be connected to one fraudulent user account node or to multiple fraudulent user account nodes. For sake of simplicity, it is assumed that the one or more attribute nodes in the set determined in 504 are connected to the particular monitored user account node and to a single fraudulent user account node.

At block 506, account matching engine 108 computes a match score for the monitored user account node based on the set of attribute nodes identified in block 504. Assumed that the one or more attribute nodes in the set determined in 504 are connected to the particular monitored user account node and to a single fraudulent user account node, in certain instances, the match score for the monitored user account node may be computed as follows:

(1) Determine a number ("NS") of attribute nodes in the set of shared attribute nodes identified in 504 for the monitored user account node;
(2) Determine a number ("NAFA") of all attribute nodes connected via edges to the single fraudulent user account node; and
(3) Compute a match score for the monitored user account node as a ratio (or percentage) between the number of attribute nodes in the set of shared attribute nodes ("NS") and the number ("NAFA") of all attribute nodes connected via edges with the single fraudulent user account node (determined in (2)). Accordingly, in one use case, Match score for monitored user account node (as a %)=(NS/NAFA)*100

At block 508, account matching engine 108 determines whether, based upon the match score computed in block 506 for the monitored user account node, the monitored user account represented by the monitored user account node is to be identified as a potentially fraudulent user account. In certain embodiments, this is done by checking, in block 508, if the match score computed in 506 exceeds or matches a preconfigured threshold value. In examples where the match score is computed as a percentage, the preconfigured threshold value may also be expressed as a percentage value (e.g., a value between 0% to 100%). For example, the preconfigured threshold value may be set to be 50%, 80%, 95%, etc. In certain embodiments, information identifying the computation technique to be used for computing a match score for a monitored user account node and information identifying the threshold value may be specified in fraud detection information 122.

If it is determined in block 508, if the match score does not exceed or match the preconfigured threshold, then the fraud detection system continues monitoring and computing match scores for the monitored user account nodes in block 514. If it is determined in block 508 that the match score exceeds or matches the preconfigured threshold thereby indicating that the monitored user account represented by the monitored user account node is to be identified as being potentially fraudulent, then at block 510, one or more actions to be performed or initiated responsive to the identification are determined. In certain embodiments, such as the embodiment depicted in FIG. 1, upon determining that the match score equals or exceeds a threshold, account matching engine 108 transmits fraud analysis information 110 (shown in FIG. 1) to actions engine 112. The fraud analysis information 110 may include, for instance, information identifying the monitored user account that is identified as being potentially fraudulent. In some instances, the fraud analysis information 110 may also include information identifying the match score computed by account matching engine 108 for the monitored user account node representing the monitored user account. Actions engine 112 may then identify one or more actions to be performed or initiated responsive to the monitored user account node being identified as potentially fraudulent. In certain examples, actions engine 112 may use actions information 124 to identify the one or more responsive actions to be performed or initiated for the monitored user account node.

In certain examples, the actions information 124 may identify one or more actions to be taken. In a simple use case scenario, the one or more actions may include sending a message (e.g., a text, an email, etc.) to a system administrator (or whoever has been identified for receiving such a message) that the particular monitored user account is potentially fraudulent. Other actions may include one or more actions to limit the use of the particular monitored user account such as by limiting the resources that can be accessed or the tasks that can be performed using the user account (e.g., quarantining the monitored user account).

In certain embodiments, the actions information 124 may specify actions and conditions associated with the actions. Based upon the fraud analysis information 110 received from account matching engine 108, actions engine 112 may determine which of the conditions are satisfied and initiate one or more actions associated with the satisfied conditions. For example:

(1) Send notification to a system administer regarding the monitored user account if the match score is between 50% and 89%.
(2) Restrict ability to perform tasks T1 and T2 and prevent access to resources R1 and R2 if the match score is 90% or above.

(3) Quarantine the monitored user account if the match score is 95% or higher.

At block 512, actions engine 112 performs the actions identified in block 510. As noted above, actions engine 112 may identify one or more actions to be taken responsive to a particular monitored user account being identified as potentially being fraudulent. For instance, a first action A1 may include sending a notification or message (e.g., via an email) to an administrator of the organization indicating that the particular monitored user account represented by the monitored user account node is a potentially fraudulent account. A second action A2 may include imposing stricter policies to limit the activity associated with the monitored user account such as requiring a user corresponding to the monitored user account to go through additional email and phone verification steps. As another example, a third action A3 may include quarantining the particular monitored user account when the match score for the monitored user account node is at least a third percentage value and so on. Additional details related to the operations performed by account matching engine 108 and actions engine 112 at blocks 504-510 to identify potentially fraudulent user accounts are now described using the following examples.

In the description above for FIG. 5, an assumption was made that a monitored user account node for which a match score is being computed shares one or more attributes with a single fraudulent user account node. While this was assumed for a simple use case, this is not intended to be limiting. It is very possible that the set of one or more shared attributes identified in 504 correspond to attributes shared by the monitored user account node with multiple fraudulent user account nodes. For example, the set of shared attributes may include one or more attribute nodes that the monitored user account node shares with a first fraudulent user account node, one or more attribute nodes that the monitored user account node shares with a second fraudulent user account node, and so on. In such a scenario, in certain embodiments, multiple match scores may be computed for the monitored user account node, with one match score computed for each fraudulent user account node that shares an attribute with the monitored user account node. Each of the match scores may then be compared individually with the threshold in 508 to determine if the monitored user account corresponding to the monitored user account node is to be identified as a potentially fraudulent user account. In certain embodiments, instead of each match score being compared to the threshold, an aggregate match score may first be computed for the monitored user account node based upon the multiple match scores, and the aggregate match score compared to the threshold.

There are different ways in which match scores are generated. In certain use cases, all the attribute nodes are treated equally and given the same weight or importance for calculating match scores. In other embodiments, it is possible to emphasize or deemphasize the importance of certain attributes. For example, a certain attribute (e.g., an attribute identifying a domain name) may be highly probative of whether or not a monitored user account is fraudulent. A system administrator may want to thus emphasize the presence of this attribute in the computation of match scores. In certain embodiments, the system administrator can do this by assigning an attribute weight to the attribute. A default weight of "1" may be assigned to each attribute node implying equal weightage of all the attributes. For an attribute node with a weight of 1, when the attribute node is in the set of shared attribute nodes, it counts as a single attribute match for purpose of match score computation. An attribute can be emphasized for purposes of match score computation by giving its attribute node a weight higher than 1. For example, an attribute node with a weight of 2, when the attribute node is in the set of shared attribute nodes, counts as two for purposes of match score computation. An attribute can be emphasized for purposes of match score computation by giving its attribute node a weight lower than 1. For example, an attribute node with a weight of 0.5, when the attribute node is in the set of shared attribute nodes, counts as 0.5 for purposes of match score computation. In certain embodiments, the attribute weights are associated with the attribute nodes in the bipartite graph.

For attributes that are shared between a monitored user account node and one or more fraudulent user account nodes, the attribute weights associated with the shared attributes are taken into consideration when computing the match score for the monitored user account node.

In the example discussed above, the match score for a monitored user account node (as a %) was computed using the formula (NS/NAFA)*100, where "NS" is the number of attribute nodes in the set of shared attribute nodes, and "NAFA" is the total number of all attribute nodes for the fraudulent user account node. For example, if NAFA=10 and NS=5, and assuming each shared attribute is weighed evenly, then the match score for the monitored user account node is ((1+1+1+1+1)/10)*100=50%. If, however, the weight for one of the shared attribute nodes is 2 (say the second shared attribute node), then the match score for the monitored user account node is ((1+2+1+1+1)/10)*100=60%. As can be seen, even though the number of shared attributes is the same (i.e., 5), due to the added weight given to one of the shared attributes, the match score has increased.

In certain examples, the weight associated with an attribute node representing an attribute may be modified based upon how common or uncommon (or unique) the attribute is in the bipartite graph. The commonness or uniqueness of an attribute may be measured based upon the number of user accounts that share the attribute. In the bipartite graph, this is measured by the number of edges (from user account nodes, including fraudulent user account nodes and monitored user account nodes) connected to the attribute node representing that attribute. A greater number of user account nodes sharing that attribute (i.e., a greater number of edges to the attribute node representing that attribute) may translate to an attribute of lower importance (i.e., lower relevance) than an attribute node that is connected to a fewer number of user account nodes in the bipartite graph. For example, fraud detection information 122 may specify that if an attribute node is connected to more than "M" user account nodes (i.e., the attribute represented by the attribute node is shared by at least "M" user accounts), then reduce the weight associated with the attribute node by 10%. In such a scenario, if a particular attribute node has an associated weight of "1", and if it is determined by the fraud detection system that the particular attribute node is connected to more than "M" edges, then the weight associated with the attribute node is changed from 1 to 0.9, representing a reduction of 10%. In this manner, the importance of that attribute in the computation of a match score is reduced or deemphasized. As the number of user accounts that share an attribute can change dynamically, the weight associated with an attribute node representing the attribute can also change dynamically.

Various different modification parameters or conditions may be specified for modifying the weights associated with attribute nodes. Examples include, but are not limited to:

(a) Reduce the weight associated with an attribute (i.e., with its attribute node) by 10% if the attribute node is connected to more than 500 user account nodes.
(b) Reduce the weight associated with an attribute (i.e., with its attribute node) by 20% if the attribute node is connected to more than 5000 user account nodes.
(c) Increase the weight associated with an attribute (i.e., with its attribute node) by 10% if the attribute node is connected to less than 50 user account nodes.
(d) Reduce the weight associated with an attribute (i.e., with its attribute node) by 30% if the attribute node is connected to more than 80% of the user account nodes in the bipartite graph.

In the match score computations discussed above, the fraudulent user account nodes, with which a particular monitored user account node shares attributes, are treated equally in the computation of match scores for that particular monitored user account node. In certain use cases, certain fraudulent user accounts may be considered "more fraudulent" than other fraudulent user accounts and it may be desirable to incorporate this aspect in the computation of match scores when attributes are shared with such "more fraudulent" fraudulent user accounts. In certain embodiments, this is enabled by allowing a user (e.g., a system administrator) to assign weights to fraudulent user accounts (or to the fraudulent user account nodes representing these fraudulent user accounts) in the bipartite graph. These weights are then taken into account by the fraud detection system in computing match scores for monitored user account nodes. For example, a default weight of "1" may be assigned to each fraudulent user account node representing a fraudulent user account. The contribution of a particular fraudulent user account node can be emphasized for purposes of match score computation by changing its default weight to a weight higher than 1. The contribution of particular fraudulent user account node can be deemphasized for purposes of match score computation by changing its default weight to a weight lower than 1.

The weights associated with the fraudulent user account nodes are then used in the computation of match scores. In certain embodiments, for an attribute node than is shared by a monitored user account node and a particular fraudulent user account node, when computing a match score for the monitored user account node, the weight of the shared attribute is multiplied by the weight assigned to the particular fraudulent user account node. For example, consider a match score for a monitored user account node computed using the formula (NS/NAFA)*100, where "NS" is the number of attribute nodes in the set of shared attribute nodes shared with a particular fraudulent user account node, and "NAFA" is the total number of all attribute nodes for the particular fraudulent user account node. Assuming NAFA=10, NS=5, the weights associated with each shared attribute is 1, and the weight associated with the particular fraudulent user account node is also 1, then the match score for the monitored user account node is:

=((1+1+1+1+1)/10)*100

=50%.

Now, if the weight associated with the particular fraudulent user account node is 1.5 instead of 1, then the match score for the monitored user account node is:

=((1*1.5+1*1.5+1*1.5+1*1.5+1*1.5)/10)*100

=75%.

As can be seen from the above, even though the number of shared attributes is the same (i.e., 5), due to the added weight given to the fraudulent user account node and is corresponding fraudulent user account node, the match score has increased.

In certain examples, the weight assigned to a fraudulent user account node may be a preconfigured value that is assigned by FDS 102 at the time of creating the fraudulent user account node in the bipartite graph (e.g., as a result of performing block 304 in FIG. 3). This weight may be increased or decreased or left the same based upon how much importance is to be given to the fraudulent user account node in the computation of match scores for monitored user account nodes sharing one or more attributes with the fraudulent user account node. In certain examples, a fraudulent user account node characterized by a large number of account transactions representing fraudulent activity may be associated with a higher weight than a fraudulent user account node that is characterized by a fewer number of fraudulent transactions.

In the description provided above, each fraudulent user account node is considered individually for the computation of match scores. For example, when a monitored user account node shares a set of attributes with a fraudulent user account node, a match score is computed for the monitored user account node based upon the number of shared attributes and the number of attributes associated with the fraudulent user account node (e.g., using the formula Match score(expressed as a %)=(NS/NAFA)*100

In certain embodiments, pools of fraudulent user accounts (i.e., pools of fraudulent user account nodes) may be created for purposes of match score computations. A pool may be created to include two or more fraudulent user accounts. At the upper limit, a pool may be created that includes all the fraudulent user accounts represented by the bipartite graph. One or more such pools may be created. When a monitored user account node shares one or more attributes with a fraudulent user account node and the fraudulent user account node is part of a pool, in addition to a match score being computed specific for that fraudulent user account node, a match score may also be computed for the pool. For example, a match score computation formula may be specified (e.g., as part of fraud detection information 122) on how pool-based statistics are to be used for computing the pool-based match score. One or more thresholds may also be specified for comparing the pool-based match score to determine if the monitored user account node is to be identified as a potentially fraudulent user account.

For example, as part of the processing performed in block 506, account matching engine 108 may compute a pool-based match score for a monitored user account node based on identifying that the set of shared attribute nodes include one or more attributes associated with a fraudulent user account node that is part of a pool. The pool-based match score thus computed may then be compared with a pool-based threshold to determine if the monitored user account node is to be identified as a potentially fraudulent user account. Examples of pool-based score computation include:
(1) Determining a number of attribute nodes (NS) that the monitored user account node shares with a particular fraudulent user account node.
(2) Determining a number of attribute nodes (NAFA) associated with the particular fraudulent user account node.

(3) Upon determining that the particular fraudulent user account node is part of a pool, determining a total number (NP) of attribute nodes associated with fraudulent user account nodes in the pool.
(4) Computing a match score for the monitored user account node for the particular fraudulent user account node using the formula: (NS/NAFA)*100.
(5) Computing a pool-based match score for the monitored user account node using the formula: (NS/NP)*100.

Figure 6:
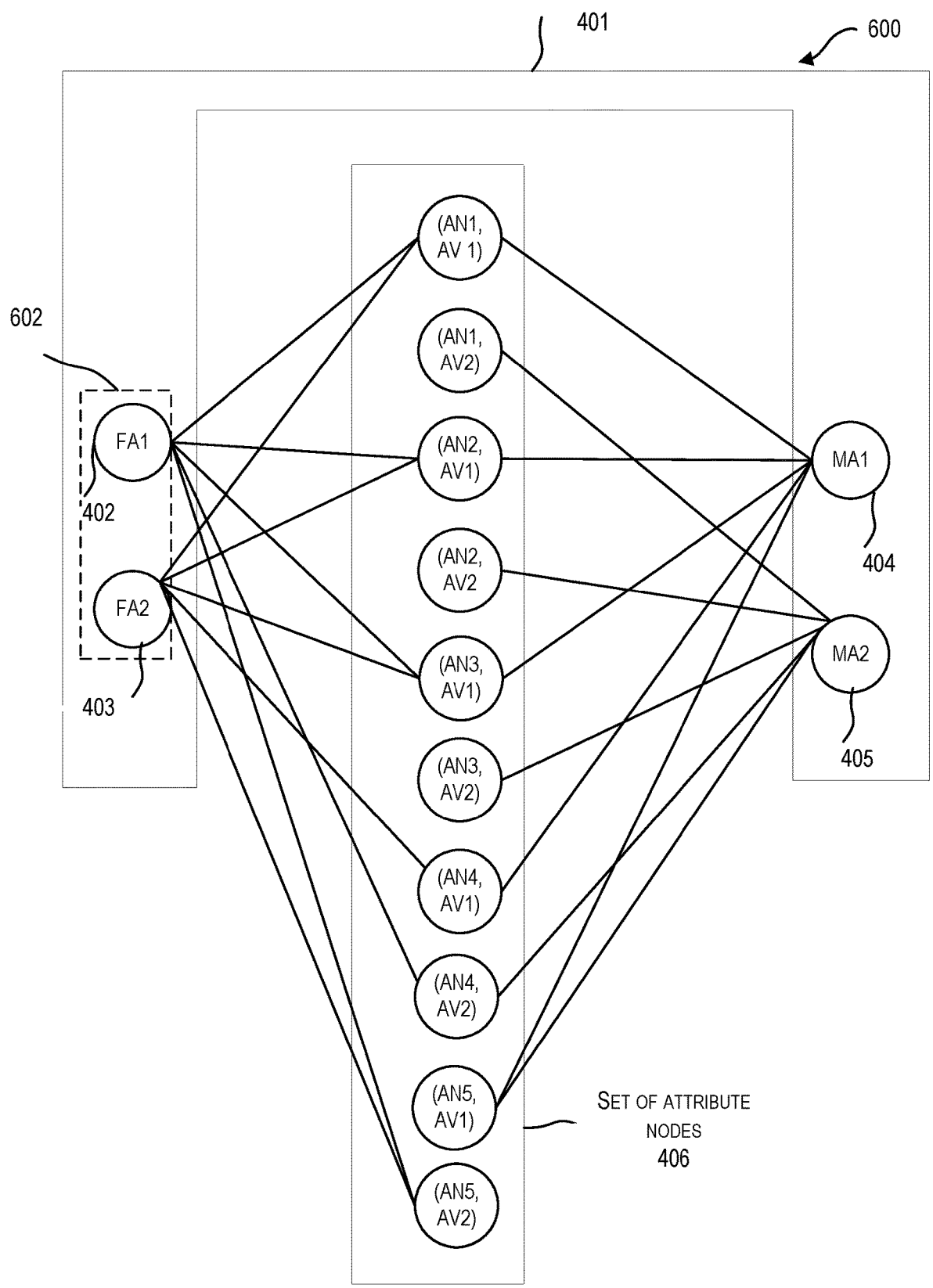
FIG. 6 is another example of a bipartite graph generated by the fraud detection system (FDS) shown in FIG. 1 for identifying potentially fraudulent accounts, according to certain embodiments.

FIG. 6 is another example of a bipartite graph 600 generated by the fraud detection system (FDS) shown in FIG. 1 for identifying potentially fraudulent accounts, according to certain embodiments. In certain embodiments, bipartite graph 600 may be generated by graph generation engine 104 in FDS 102 using the processes described in FIGS. 2 and 3. Bipartite graph 600 is similar to bipartite graph shown in FIG. 4 and comprises two sets of disjoint and independent nodes, namely, a set of user account nodes 401 representing user accounts and a set of attribute nodes 406 representing attributes. The set of user account nodes 401 comprise a set of one or more fraudulent user account nodes (402, 403) representing fraudulent user accounts and a set of one or more monitored user account nodes (404, 405) representing monitored user accounts being monitored by FDS 102. In a certain implementation, account matching engine 108 may create a pool of fraudulent user account nodes 602 from the set of fraudulent user account nodes for computing shared attribute nodes for a monitored user account node in the set of monitored user account nodes. In certain examples, a fraudulent account node from the set of fraudulent account nodes is included in the pool of fraudulent user account nodes 602 if the fraudulent account node is connected to at least one attribute node in the set of shared attribute nodes computed for the monitored user account nodes in the bipartite graph.

The set of fraudulent account nodes (402, 403), the set of monitored account nodes (404, 405) and the set of attribute nodes 406 shown in bipartite graph 400 are for illustrative purposes and are not intended to be restrictive or limiting. In alternate embodiments, bipartite graph 600 can have more or fewer account nodes and more or fewer attribute nodes. For instance, in the example shown in FIG. 6, bipartite graph 600 may comprise more fraudulent user account nodes and one or more of these fraudulent user account nodes may or may not be included in the pool of fraudulent user account nodes 602. In certain examples, and as previously discussed in FIG. 6, account matching engine 108 may compute the match score for a monitored user account node based upon the number of nodes in the set of matching nodes and the total number of attribute nodes in the pool of fraudulent account nodes 602. Additional examples of the computation of match scores for a monitored user account are described in the example section below.

Example #1

The first example computes a match score for a monitored user account node by identifying a set of one or more shared attribute nodes for the monitored user account node based on a "single fraudulent node" in the bipartite graph. In this example, each attribute node in the set of shared attribute nodes is connected via edges to both the monitored user account node and to the single fraudulent node in the bipartite graph.

Using the example of bipartite graph 400 shown in FIG. 4, the set of shared attributes for monitored user account node, MA1, that are connected to both MA1 and to a single fraudulent user account node, (e.g., FA1) comprise (AN1, AV1), (AN2, AV1) and (AN3, AV1). For example, the set of shared attributes may be identified as a result of executing block 504 in FIG. 5. The number of attribute nodes in the set of shared attribute nodes=3. The attribute nodes connected via edges to FA1 comprise: (AN1, AV1), (AN2, AV1), (AN3, AV1), (AN4, AV2), (AN5, AV2). Thus, the number of all attribute nodes connected via edges to FA1=5. Thus, the match score computed for MA1 in this example is 3/5=0.6 (or 60%). For example, the match score for the monitored user account node may be computed as a result of executing block 506 in FIG. 5.

In a similar manner, account matching engine 108 may compute the match score for monitored user account node, MA2, identified in bipartite graph 400. For instance, the set of shared attributes for monitored user account node, MA2, that are connected to both MA2 and to fraudulent user account node, FA1 comprise (AN4, AV2). The number of attribute nodes in the set of shared attribute nodes=1. The attribute nodes connected via edges to FA1 comprise: (AN1, AV1), (AN2, AV1), (AN3, AV1)), (AN4, AV2), (AN5, AV2) and the number of all attribute nodes connected via edges to FA1=5. Thus, the match score computed for MA2 in this example is 1/5=0.2 (or 20%).

Example #2

The second example shown below illustrates the manner in which a match score is computed for a monitored user account node, MA1 using a "pool of fraudulent nodes" identified in the bipartite graph. In this example, both fraudulent user account nodes, FA1 and FA2 are included in the pool of fraudulent user account nodes for computing the match score for monitored user account node MA1 because both FA1 and FA2 have at least one shared attribute node with MA1. In other words, both FA1 and FA2 are connected to at least one attribute node in the set of shared attribute nodes computed for the monitored user account node, MA1.

Using the example of bipartite graph 600 shown in FIG. 6, the set of shared attribute nodes for monitored user account node, MA1, that are connected to both MA1 and to the fraudulent account nodes, (e.g., FA1 or FA2) comprise (AN1, AV1), (AN2, AV1) and (AN3, AV1) and (AN4, AV1). For example, the set of shared attributes is identified as a result of executing block 504 in FIG. 5. The number of attribute nodes in the set of shared attribute nodes=4. The total number of attribute nodes connected via edges to the pool of fraudulent account nodes (FA1 or FA2) comprise: (AN1, AV1), (AN2, AV1), (AN3, AV1)),(AN4, AV1), (AN4, AV2), (AN5, AV2). Thus, the number of all attribute nodes connected via edges to FA1 or FA2=6. Thus, the match score computed for MA1 using a pool of FAs (FA1 and FA2) is 4/6=0.66 (or 66%). For example, the match score for the monitored user account node may be computed as a result of executing block 506 in FIG. 5.

In the example discussed above, using a "pool of fraudulent account nodes" for computing the match score for a monitored user account node resulted in the computation of a different match score for the monitored user account node. For instance, the match score for monitored user account node MA1 increased from 60% to 66% based on identifying a set of shared attributes for MA1 that were connected to both MA1 and to at least one fraudulent user account node in the "pool of fraudulent account nodes" (FA1, FA2).

Example #3

The third example shown below illustrates the manner in which a match score for a monitored user account node using a single fraudulent user account node can further be modified based on attribute weights assigned to at least one attribute node in the set of shared attribute nodes for the monitored user account node. As noted above in the discussion of FIG. 5, account matching engine 108 may compute a modified match score for the monitored user account node by:
(1) Determining the attribute weight assigned to at least one attribute node in the set of shared attribute nodes for the monitored user account node.
(2) Determining the number of user account nodes (e.g., monitored user account nodes and fraudulent user account nodes) connected to the attribute node.
(3) Modifying the attribute weight for the attribute node based on the number of user account nodes determined in (2). For instance, the modified attribute weight can be determined using a rule stored in fraud detection rules 122 that reduces (i.e., modifies) the attribute weight for each attribute node by 10% for each user account node connected to the attribute node.
(4) Computing a new match score for the monitored user account node based upon the modified attribute weight computed for the attribute node.

Using the example of bipartite graph 400 shown in FIG. 4, the set of shared attributes for monitored user account node, MA1, that are connected to both MA1 and to a single fraudulent account node (e.g., FA1) comprise (AN1, AV1), (AN2, AV1) and (AN3, AV1). In this example, all attribute nodes are assigned the same attribute weight of 1. The attribute weight for each attribute node is then modified by determining the number of user account nodes (e.g., monitored account nodes and fraudulent account nodes) that are connected via edges to the attribute node. For instance, the number of user account nodes connected via edges to attribute node (AN1, AV1)=3, since attribute node (AN1, AV1) is connected via edges to MA1, FA1 and FA2. By applying a rule, for example, which reduces the attribute weight for the attribute node by 10% for each user account node connected to the attribute node, the modified attribute weight computed for attribute node (AN1, AV1) is =0.7. Similarly, the modified attribute weight computed for attribute node (AN2, AV1) is =0.7 and the modified attribute weight computed for attribute node (AN3, AV1) is also =0.7. Based on the modified attribute weights, the new match score is computed for monitored user account node MA1 as follows:

New match score for MA1=0.7*(AN1, AV1)+0.7*(AN2, AV1)+0.7*(AN3, AV1)/the number of all attribute nodes connected via edges to FA1 (which is equal to 5 in this example)=2.1/5 =0.42 (or 42%).

In example #3 discussed above, it may be noted that the match score for monitored user account node MA1 using a single fraudulent account node FA1 is reduced to 42% (from 60% in example 1) based on modified attribute weights computed for the attribute nodes in the set of shared attribute nodes for MA1.

Example #4

The fourth example shown below illustrates the manner in which a match score for a monitored user account node using a pool of fraudulent account nodes can further be modified based on attribute weights assigned to at least one attribute node in the set of shared attribute nodes for the monitored account node.

Using the example of bipartite graph 500 shown in FIG. 5, the set of shared attributes for monitored account, MA1, that are connected to both MA1 and to the pool of fraudulent account nodes, (FA1 or FA2) comprise (AN1, AV1), (AN2, AV1), (AN3, AV1) and (AN4, AV1). In this example, all attribute nodes are assigned the same initial attribute weight of 1. The attribute weight for each attribute node is then modified by determining the number of account nodes (e.g., monitored account nodes and fraudulent account nodes) that are connected via edges to the attribute node. The number of account nodes connected via edges to attribute node (AN1, AV1)=3, since attribute node (AN1, AV1) is connected via edges to MA1, FA1 and FA2. By applying the rule noted above which reduces the attribute weight for the attribute node by 10% for each account node connected to the attribute node, the modified attribute weight computed for attribute node (AN1, AV1) is =0.7. Similarly, the modified attribute weight computed for attribute node (AN2, AV1) is =0.7, the modified attribute weight computed for attribute node (AN3, AV1) is =0.7. Since, the number of account nodes connected via edges to attribute node (AN4, AV1)=2 (because attribute node (AN1, AV1) is connected via edges to FA2 and MA1), the modified attribute weight computed for attribute node (AN4, AV1)=0.8. Based on the modified attribute weights, the new match score computed for monitored account node MA1 using both FA1 and FA2 is shown below:

New match score for MA1=0.7*(AN1, AV1)+0.7*(AN2, AV1)+0.7*(AN3, AV1)+0.8*(AN4, AV1)/the number of all attribute nodes connected via edges to FA1 and FA2 (which is equal to 6 in this example)=2.9/6=0.48 (or 48%).

In example #4 discussed above, it may be noted that the match score for monitored user account node MA1 using a pool of fraudulent user account nodes reduced to 48% (from 66% shown in example #2) based on modified attribute weights computed for the attribute nodes in the set of shared attribute nodes for MA1.

Example #5

The fifth example shown below illustrates the manner in which a match score for a monitored user account node can further be modified based on a weight assigned to a fraudulent user account node. In this example, the attribute nodes in the set of shared attribute nodes for the monitored user account node are connected via edges to both the monitored user account node and to the fraudulent user account node. As noted above in the discussion of FIG. 6, account matching engine 108 may compute a modified match score for the monitored user account node based on a weight assigned to a fraudulent user account node by:
(1) Determining the attribute weight assigned to at least one attribute node in the set of shared attribute nodes for the monitored user account node.
(2) Determining the weight assigned to the fraudulent user account node.
(3) Modifying the attribute weight for the attribute node based on the weight assigned to the fraudulent user account node.
(4) Computing a new match score for the monitored user account node based upon the modified attribute weight computed for the attribute node.

Using the example of bipartite graph 400 shown in FIG. 4, the set of shared attribute nodes for monitored user account node, MA1, that are connected to both MA1 and to a single fraudulent account node (e.g., FA1) comprise (AN1, AV1), (AN2, AV1) and (AN3, AV1). In this example, all attribute nodes are assigned the same attribute weight of 1. In this example, assume that the weight assigned to FA1 is determined to be 1.5. In a certain implementation, the modified attribute weight for each attribute is computed to be 1.5 since each attribute node inherits the attribute weight of the fraudulent user account node. Based on the modified attribute weights, the new match score is computed for monitored user account node MA1 is shown below:

New match score for MA1=1.5*(AN1, AV1)+1.5*(AN2, AV1)+1.5*(AN3, AV1)/the number of all attribute nodes connected via edges to FA1 (which is equal to 5 in this example)=4.5/5=0.9 (or 90%).

In example #5 discussed above, it may be noted that the match score for monitored user account node MA1 based on modified attribute weights computed for the attribute nodes in the set of shared attribute nodes for MA1 using the weight of the fraudulent node increased from 60% (computed in example 1) to 90%. In this example, since the match score for monitored user account node MA1 is 90%, actions engine 112 may identify an action to be taken for MA1 such as imposing stricter policies to limit the activity associated with the monitored user account or even quarantining the monitored user account.

The fraud detection system described in the present disclosure provides several technical advancements over conventional fraud detection systems. The fraud detection system described herein is very flexible and dynamic in nature. The user accounts, including the known fraudulent user accounts and the monitored user accounts, can change dynamically. For example, new user accounts may be identified as fraudulent user accounts, new user accounts can be added for monitoring, user accounts can be deleted, and the like. The attributes associated with the user accounts can also change dynamically. The number and types of attributes known for one user account can be different from the number and types of attributes known for another user accounts. The fraud detection system updates the graph to reflect the dynamic changes. This enables the fraud detection system to perform fraud detection in a completely dynamic manner. The fraud detection system describes herein is not encumbered by static specific attribute-based rules. The attribute matching is performed by the fraud detection system in a manner that accounts and compensates for the possibly changing behavior pattern of a known fraudster. Unlike AI/ML based techniques, there is no training data or training required. The fraud detection system automatically adapts to information available about user accounts. Due to its adaptability, the fraud detection system is easy to administer and use. Additionally, the fraud detection system described in this disclosure enables the detection of potentially fraudulent user accounts based on all the varied pieces of information known about the user account rather than just based upon prior actions performed by a user of the user account. The attribute matching and match score computation techniques describes herein provide a mechanism for repeatable and reliable fraud detection in various different situations. A graph, such as a bipartite graph, provides a memory efficient way of representing and using user accounts and attributes information. Additionally, the fraud detection system described herein can automatically identify actions to be performed for a monitored user account that has been identified as potentially fraudulent. The actions can be used by a user (e.g., an administrator) of an organization to more intelligently determine appropriate measures to be taken for the potentially fraudulent user account.

Example Implementation

Figure 7:
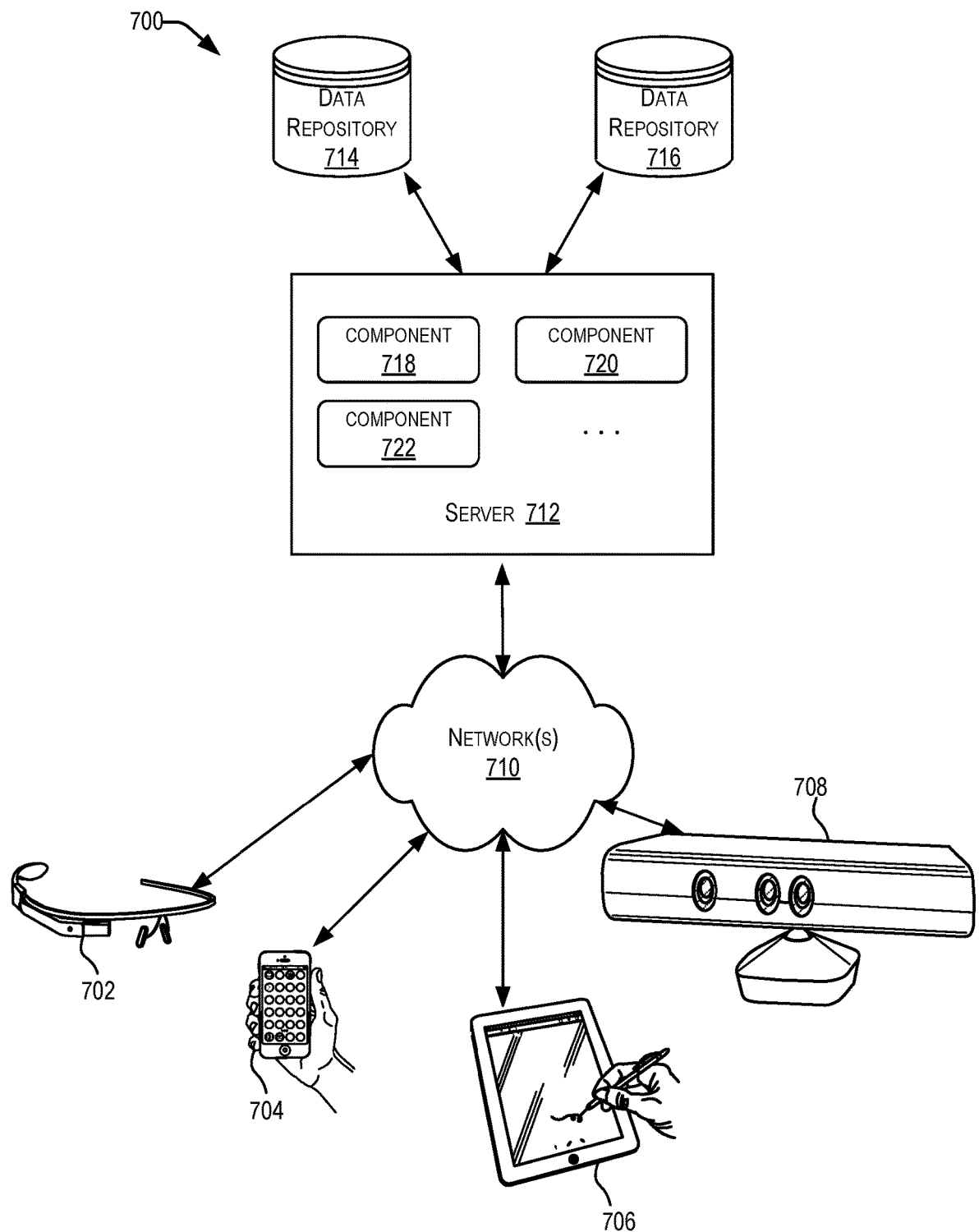
FIG. 7 depicts a simplified diagram of a distributed system for implementing an embodiment.

FIG. 7 depicts a simplified diagram of a distributed system 700 for implementing an embodiment. In the illustrated embodiment, distributed system 700 includes one or more client computing devices 702, 704, 706, and 708, coupled to a server 712 via one or more communication networks 710. Clients computing devices 702, 704, 706, and 708 may be configured to execute one or more applications.

In various embodiments, server 712 may be adapted to run one or more services or software applications that enable the processing described in this disclosure.

In certain embodiments, server 712 may also provide other services or software applications that can include non-virtual and virtual environments. In some embodiments, these services may be offered as web-based or cloud services, such as under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, server 712 may include one or more components 718, 720 and 722 that implement the functions performed by server 712. These components may include software components that may be executed by one or more processors, hardware components, or combinations thereof. It should be appreciated that various different system configurations are possible, which may be different from distributed system 700. The embodiment shown in FIG. 7 is thus one example of a distributed system for implementing an embodiment system and is not intended to be limiting.

Users may use client computing devices 702, 704, 706, and/or 708 to interact with server 712 in accordance with the teachings of this disclosure. A client device may provide an interface that enables a user of the client device to interact with the client device. The client device may also output information to the user via this interface. Although FIG. 7 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintos®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 710 may be any type of network familiar to those skilled in the art that can support data communications using any of a variety of available protocols, including without limitation TCP/IP (transmission control protocol/

Internet protocol), SNA (systems network architecture), IPX (Internet packet exchange), AppleTalk®, and the like. Merely by way of example, network(s) 710 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization such as one or more flexible pools of logical storage devices that can be virtualized to maintain virtual storage devices for the server. In various embodiments, server 712 may be adapted to run one or more services or software applications that provide the functionality described in the foregoing disclosure.

The computing systems in server 712 may run one or more operating systems including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more data repositories 714, 716. These data repositories may be used to store data and other information in certain embodiments. For example, one or more of the data repositories 714, 716 may be used to store data or information generated by the processing described herein and/or data or information used for the processing described herein. Data repositories 714, 716 may reside in a variety of locations. For example, a data repository used by server 712 may be local to server 712 or may be remote from server 712 and in communication with server 712 via a network-based or dedicated connection. Data repositories 714, 716 may be of different types. In certain embodiments, a data repository used by server 712 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 714, 716 may also be used by applications to store application data. The data repositories used by applications may be of different types such as, for example, a key-value store repository, an object store repository, or a general storage repository supported by a file system.

Figure 8:
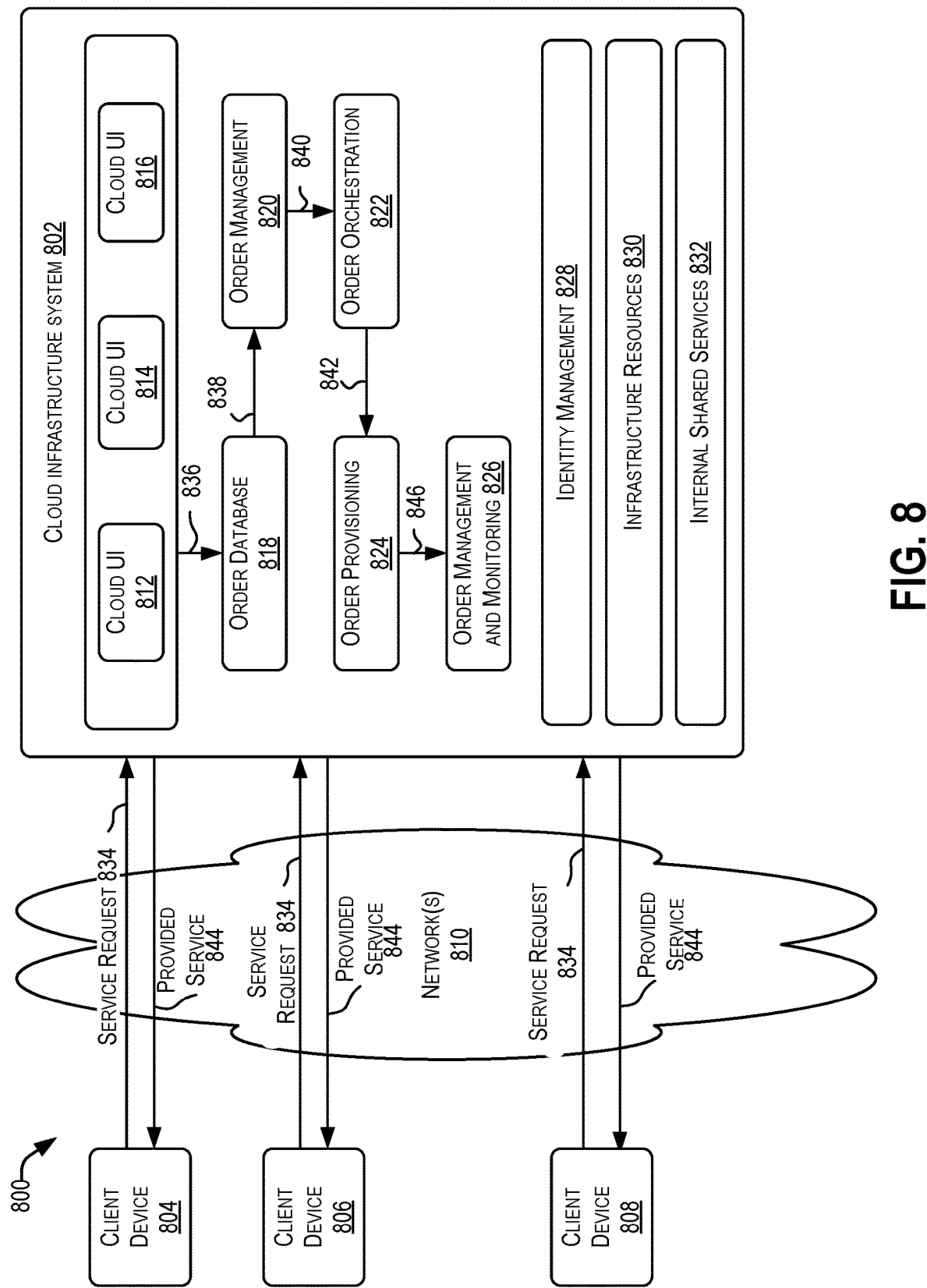
FIG. 8 is a simplified block diagram of a cloud-based system environment in which functionalities described herein may be offered as cloud services, in accordance with certain embodiments.

In certain embodiments, the fraud detection functionalities described in this disclosure may be offered as services via a cloud environment. FIG. 8 is a simplified block diagram of a cloud-based system environment in which functionalities described herein may be offered as cloud services, in accordance with certain embodiments. In the embodiment depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 612. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The embodiment depicted in FIG. 8 is only one example of a cloud infrastructure system and is not intended to be limiting. It should be appreciated that, in some other embodiments, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative embodiments.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 802. Cloud infrastructure system 802 then performs processing to provide the services requested in the customer's subscription order. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public customer, where the customer can be an individual or an enterprise. In certain other embodiments, under a private cloud model, cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 802 and the services provided may be shared by several organizations in a related community. Various other models such as hybrids of the above mentioned models may also be used.

Client computing devices 804, 806, and 808 may be of different types (such as devices 602, 604, 606, and 608 depicted in FIG. 1) and may be capable of operating one or more client applications. A user may use a client device to interact with cloud infrastructure system 802, such as to request a service provided by cloud infrastructure system 802.

In some embodiments, the processing performed by cloud infrastructure system 802 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like.

In certain embodiments, to facilitate efficient provisioning of these resources for supporting the various cloud services provided by cloud infrastructure system 802 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users or customers of cloud infrastructure system 802 to interact with cloud infrastructure system 802. User interface subsystem 812 may include various different interfaces such as a web interface 814, an online store interface 216 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, and 818. For example, a customer may access the online store, browse cloud services offered by cloud infrastructure system 802, and place a subscription order for one or more services offered by cloud infrastructure system 802 that the customer wishes to subscribe to.

The service request may include information identifying the customer and one or more services that the customer desires to subscribe to.

In certain embodiments, such as the embodiment depicted in FIG. 8, cloud infrastructure system 802 may comprise an order management subsystem (OMS) 820 that is configured to process the new order. As part of this processing, OMS 820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/ scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 802 may send a response or notification 844 to the requesting customer to indicate when the requested service is now ready for use. In some instances, information (e.g., a link) may be sent to the customer that enables the customer to start using and availing the benefits of the requested services.

Cloud infrastructure system 802 may provide services to multiple customers. For each customer, cloud infrastructure system 802 is responsible for managing information related to one or more subscription orders received from the customer, maintaining customer data related to the orders, and providing the requested services to the customer. Cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 802 may provide services to multiple customers in parallel. Cloud infrastructure system 802 may store information for these customers, including possibly proprietary information. In certain embodiments, cloud infrastructure system 802 comprises an identity management subsystem (IMS) 828 that is configured to manage customers information and provide the separation of the managed information such that information related to one customer is not accessible by another customer. IMS 828 may be configured to provide various security-related services such as identity services, such as information access management, authentication and authorization services, services for managing customer identities and roles and related capabilities, and the like.

Figure 9:
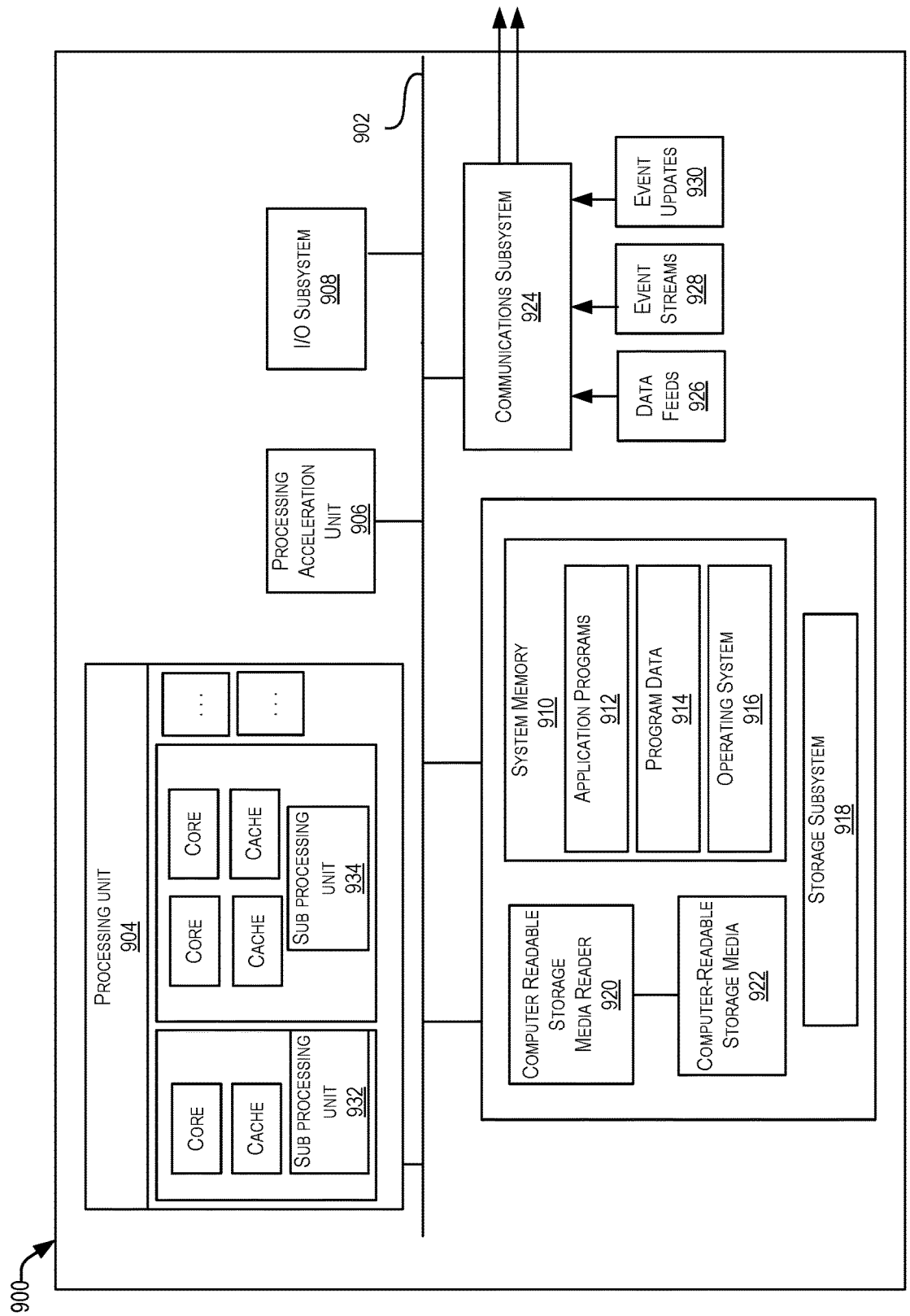
FIG. 9 illustrates an exemplary computer system that may be used to implement certain embodiments.

FIG. 9 illustrates an exemplary computer system 900 that may be used to implement certain embodiments. For example, in some embodiments, computer system 900 may be used to implement any of the system and subsystems for performing processing according to the present disclosure. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 can be organized into one or more processing units 932, 934, etc. A processing unit may include one or more processors, one or more cores from the same or different processors, a combination of cores and processors, or other combinations of cores and processors. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above. In instances where computer system 900 is executing one or more virtual machines, one or more processing units may be allocated to each virtual machine.

In certain embodiments, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 860 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some embodiments. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide a repository for storing data used in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 922 may store programming and data constructs that provide the functionality of some embodiments. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 918 may also include a computer-readable storage media reader 920 that can further be connected to computer-readable storage media 922. Reader 920 may receive and be configured to read data from a memory device such as a disk, a flash drive, etc.

In certain embodiments, computer system 900 may support virtualization technologies, including but not limited to virtualization of processing and memory resources. For example, computer system 900 may provide support for executing one or more virtual machines. In certain embodiments, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:

accessing, by a computer system, a graph comprising a plurality of nodes, the graph stored in a memory of the computer system, the plurality of nodes including a plurality of user account nodes and a plurality of attribute nodes, each user account node in the plurality of user account nodes representing a user account, each attribute node in the plurality of attribute nodes comprising information identifying an attribute characterized by an attribute name and a value associated with the attribute name, wherein, each node in the plurality of user account nodes is connected via one or more edges to one or more attribute nodes from the plurality of attribute nodes representing one or more attributes that are associated with the user account represented by the user account node, the plurality of user account nodes comprising a set of one or more fraudulent user account nodes corresponding to one or more user accounts known as being fraudulent, the plurality of user account nodes further comprising a set of one or more monitored user account nodes corresponding to one or more user accounts being monitored;

for a first monitored user account node in the plurality of monitored user account nodes, identifying, by the computer system, by searching the graph stored in the memory of the computer system, a set of one or more shared attribute nodes from the set of attribute nodes, wherein each attribute node in the set of shared attribute nodes is connected via edges to both the first monitored user account node and to at least one fraudulent user account node from the plurality of fraudulent user account nodes;

based on the set of one or more shared attribute nodes in the graph stored in the memory of the computer system, computing, by the computer system, a match score for the first monitored user account node by:
 determining a number of attribute nodes in the set of one or more shared attribute nodes;
 determining a number of attribute nodes connected via edges to a first fraudulent user account node from the set of fraudulent user account nodes; and
 computing the match score based upon the number of attribute nodes in the set of one or more shared attribute nodes and the number of attribute nodes connected via edges with the first fraudulent user account node;

determining, by the computer system, based upon the match score computed for the first monitored user account node in the graph stored in the memory of the computer system, that a first monitored user account corresponding to the first monitored user account node is potentially a fraudulent user account;

responsive to the determining, identifying, by the computer system, an action to be performed with respect to the first monitored user account corresponding to the first monitored user account node;

performing, by the computer system, the action, wherein the action comprises tagging the first monitored user account as a potentially fraudulent user account;

receiving, by the computer system, via a data stream, monitored user account information identifying one or more new user accounts being monitored;

receiving, by the computer system, via the data stream, fraudulent user account information identifying one or more new user accounts known as being fraudulent; and dynamically updating, by the computer system, the graph based at least in part on the monitored user account information and the fraudulent user account information.

2. The method of claim 1, wherein the graph is a bipartite graph and wherein no two attribute nodes in the graph have the same attribute and associated value.

3. The method of claim 1, wherein determining that the first monitored user account node is potentially a fraudulent user account comprises determining that the match score computed for the first monitored user account node meets or exceeds a preconfigured threshold.

4. The method of claim 1, wherein:
 the graph is generated in the memory of the computer system using one or more processors of the computing system;
 the graph is a bipartite graph comprising user account nodes representing user accounts,
 within the bipartite graph, each user account node is connected by one or more edges to one or more attribute nodes,
 each attribute node comprises a single key-value pair, wherein the key identifies an attribute name and the value identifies an attribute value associated with the attribute name, and
 the memory is random access memory (RAM) of the computer system.

5. The method of claim 1, wherein the match score is a ratio or percentage between the number of attribute nodes in the set of one or more shared attribute nodes and the number of attribute nodes connected via edges to the first fraudulent user account node.

6. The method of claim 1, further comprising:
 identifying a plurality of fraudulent user account nodes from the set of fraudulent user account nodes, wherein a fraudulent user account node from the set of fraudulent user account nodes is included in the plurality of fraudulent account nodes if the fraudulent user account node is connected to at least one attribute node in the set of one or more shared attribute nodes;
 determining a total number of attribute nodes connected to the plurality of fraudulent account nodes;
 determining a number of attribute nodes in the set of shared attribute nodes; and
 computing the match score based upon the number of attribute nodes in the set of one or more shared attribute nodes and the total number of attribute nodes connected to the plurality of fraudulent user account nodes.

7. The method of claim 1, wherein computing the match score comprises:
for at least one attribute node in the set of one or more shared attribute nodes:
determining a number of user account nodes connected to the at least one attribute node; and
computing a weight for the at least one attribute node based upon the number of edges connected to the at least one attribute node; and
using the weight to compute the match score.

8. The method of claim 1, wherein computing the match score comprises:
for the at least one attribute node:
determining an attribute weight for the at least one attribute node; and
modifying the attribute weight for the at least one attribute node to generate a modified attribute weight; and
using the modified attribute weight to compute the match score.

9. The method of claim 1 wherein computing the match score comprises:
determining, an attribute weight for each attribute node in the set of one or more shared attribute nodes; and
computing the match score based upon the attribute weights determined for the attribute nodes in the set of one or more shared attribute nodes.

10. The method of claim 1, each attribute node in the set of one or more shared attribute nodes is connected via an edge to a first fraudulent user account node from the set of fraudulent user account nodes; and
computing the match score comprises:
determining an attribute weight for at least one attribute node in the set of one or more shared attribute nodes;
obtaining a weight assigned to the first fraudulent user account node;
modifying the attribute weight for the at least one attribute node using the weight assigned to the first fraudulent user account node to generate a modified attribute weight; and
using the modified attribute weight to compute the match score for the monitored user account node.

11. The method of claim 1 wherein the action comprises communicating a message, the message indicating that the first monitored user account is a potentially fraudulent user account.

12. The method of claim 1, wherein identifying the action further comprises:
identifying a first action to be performed with respect to the first monitored user account when the match score for the first monitored user account node is at least a first percentage value; and
identifying a second action to be performed with respect to the first monitored user account when the match score for the first monitored user account node is at least a second percentage value, the first action different from the second action.

13. A system comprising:
a memory storing a graph comprising a plurality of nodes, the plurality of nodes including a plurality of user account nodes and a plurality of attribute nodes, each user account node in the plurality of user account nodes representing a user account, each attribute node in the plurality of attribute nodes comprising information identifying an attribute characterized by an attribute name and a value associated with the attribute name, wherein, each node in the plurality of user account nodes is connected via one or more edges to one or more attribute nodes from the plurality of attributes nodes representing one or more attributes that are associated with the user account represented by the user account node, the plurality of user account nodes comprising a set of one or more fraudulent user account nodes corresponding to one or more user accounts known as being fraudulent, the plurality of user account nodes further comprising a set of one or more monitored user account nodes corresponding to one or more user accounts being monitored; and
one or more processors configured to perform processing, the processing comprising:
for a first monitored user account node in the plurality of monitored user account nodes, identify, by searching the graph stored in the memory of the system, a set of one or more shared attribute nodes from the set of attribute nodes, wherein each attribute node in the set of shared attribute nodes is connected via edges to both the first monitored user account node and to at least one fraudulent user account node from the plurality of fraudulent user account nodes;
based on the set of one or more shared attribute nodes in the graph stored in the memory of the system, compute a match score for the first monitored user account node by:
determining a number of attribute nodes in the set of one or more shared attribute nodes;
determining a number of attribute nodes connected via edges to a first fraudulent user account node from the set of fraudulent user account nodes; and
computing the match score based upon the number of attribute nodes in the set of one or more shared attribute nodes and the number of attribute nodes connected via edges with the first fraudulent user account node;
determine, based upon the match score computed for the first monitored user account node in the graph stored in the memory of the system, that a first monitored user account corresponding to the first monitored user account node is potentially a fraudulent user account;
responsive to the determining, identify an action to be performed with respect to the first monitored user account corresponding to the first monitored user account node;
perform the action, wherein the action comprises tagging the first monitored user account as a potentially fraudulent user account
receive, via a data stream, monitored user account information identifying one or more new user accounts being monitored;
receive, via the data stream, fraudulent user account information identifying one or more new user accounts known as being fraudulent and
dynamically update the graph based at least in part on the monitored user account information and the fraudulent user account information.

14. The system of claim 13, wherein no two attribute nodes in the graph have the same attribute and associated value.

15. The system of claim 13, wherein:
the graph is generated in the memory of the computer system using one or more processors of the computing system;

the graph is a bipartite graph comprising user account nodes representing user accounts, within the bipartite graph, each user account node is connected by one or more edges to one or more attribute nodes, each attribute node comprises a single key-value pair, wherein the key identifies an attribute name and the value identifies an attribute value associated with the attribute name, and the memory is random access memory (RAM) of the computer system.

16. The system of claim 13, wherein the match score is a ratio or percentage between the number of attribute nodes in the set of one or more shared attribute nodes and the number of attribute nodes connected via edges to the first fraudulent user account node.

17. A non-transitory computer-readable medium having program code that is stored thereon, the program code executable by one or more processing devices for performing operations comprising:

accessing a graph comprising a plurality of nodes, the graph stored in a memory of a computer system, the plurality of nodes including a plurality of user account nodes and a plurality of attribute nodes, each user account node in the plurality of user account nodes representing a user account, each attribute node in the plurality of attribute nodes comprising information identifying an attribute characterized by an attribute name and a value associated with the attribute name, wherein, each node in the plurality of user account nodes is connected via one or more edges to one or more attribute nodes from the plurality of attributes nodes representing one or more attributes that are associated with the user account represented by the user account node, the plurality of user account nodes comprising a set of one or more fraudulent user account nodes corresponding to one or more user accounts known as being fraudulent, the plurality of user account nodes further comprising a set of one or more monitored user account nodes corresponding to one or more user accounts being monitored;

for a first monitored user account node in the plurality of monitored user account nodes, identifying, by the computer system, by searching the graph stored in the memory of the computer system, a set of one or more shared attribute nodes from the set of attribute nodes, wherein each attribute node in the set of shared attribute nodes is connected via edges to both the first monitored user account node and to at least one fraudulent user account node from the plurality of fraudulent user account nodes;

based on the set of one or more shared attribute nodes in the graph stored in the memory of the computer system, computing a match score for the first monitored user account node by:

determining a number of attribute nodes in the set of one or more shared attribute nodes;

determining a number of attribute nodes connected via edges to a first fraudulent user account node from the set of fraudulent user account nodes; and computing the match score based upon the number of attribute nodes in the set of one or more shared attribute nodes and the number of attribute nodes connected via edges with the first fraudulent user account node;

determining, based upon the match score computed for the first monitored user account node in the graph stored in the memory of the computer system, that a first monitored user account corresponding to the first monitored user account node is potentially a fraudulent user account;

responsive to the determining, identifying an action to be performed with respect to the first monitored user account corresponding to the first monitored user account node;

performing the action, wherein the action comprises tagging the first monitored user account as a potentially fraudulent user account:

receiving via a data stream, monitored user account information identifying one or more new user accounts being monitored;

receiving via the data stream, fraudulent user account information identifying one or more new user accounts known as being fraudulent; and dynamically updating the graph based at least in part on the monitored user account information and the fraudulent user account information.

18. The non-transitory computer-readable medium of claim 17, wherein the graph is a bipartite graph.

19. The non-transitory computer-readable medium of claim 17, wherein:

the graph is generated in the memory of the computer system using one or more processors of the computing system;

the graph is a bipartite graph comprising user account nodes representing user accounts, within the bipartite graph, each user account node is connected by one or more edges to one or more attribute nodes, each attribute node comprises a single key-value pair, wherein the key identifies an attribute name and the value identifies an attribute value associated with the attribute name, and the memory is random access memory (RAM) of the computer system.

* * * * *

UNITED STATES PATENT AND TRADEMARK OFFICE
CERTIFICATE OF CORRECTION

| | | |
|---|---|---|
| PATENT NO. | : 11,704,680 B2 | |
| APPLICATION NO. | : 16/993041 | |
| DATED | : July 18, 2023 | |
| INVENTOR(S) | : Compton et al. | |

It is certified that error appears in the above-identified patent and that said Letters Patent is hereby corrected as shown below:

In the Specification

In Column 3, Line 65, delete "on." and insert -- on). --, therefor.

In Column 7, Line 25, delete "on." and insert -- on). --, therefor.

In Column 12, Line 29, delete "(AN3, AV1))" and insert -- (AN3, AV1) --, therefor.

In Column 12, Line 31, delete "(AN3, AV1))" and insert -- (AN3, AV1) --, therefor.

In Column 12, Line 34, delete "(AN3, AV1))" and insert -- (AN3, AV1) --, therefor.

In Column 12, Line 37, delete "(AN3, AV1))" and insert -- (AN3, AV1) --, therefor.

In Column 16, Lines 18-33, delete "In the example discussed above, the match score for a monitored user account node (as a %) was computed using the formula (NS/NAFA)*100, where "NS" is the number of attribute nodes in the set of shared attribute nodes, and "NAFA" is the total number of all attribute nodes for the fraudulent user account node. For example, if NAFA=10 and NS=5, and assuming each shared attribute is weighed evenly, then the match score for the monitored user account node is ((1+1+1+1+1)/10)*100=50%. If, however, the weight for one of the shared attribute nodes is 2 (say the second shared attribute node), then the match score for the monitored user account node is ((1+2+1+1+1)/10)*100=60%. As can be seen, even though the number of shared attributes is the same (i.e., 5), due to the added weight given to one of the shared attributes, the match score has increased." and insert the same on Column 16, Line 17, as continuation of the same paragraph.

In Column 20, Line 47, delete "(AN3, AV1))" and insert -- (AN3, AV1) --, therefor.

In Column 24, Line 45, delete "Macintos®," and insert -- Macintosh®, --, therefor.

In Column 33, Line 41, delete "evolution)," and insert -- evolution)), --, therefor.

Signed and Sealed this
Twenty-eighth Day of May, 2024

*Katherine Kelly Vidal*

Katherine Kelly Vidal
*Director of the United States Patent and Trademark Office*

In the Claims

In Column 38, Line 51, in Claim 13, delete "account" and insert -- account; --, therefor.

In Column 38, Line 57, in Claim 13, delete "fraudulent" and insert -- fraudulent; --, therefor.

In Column 40, Line 24, in Claim 17, delete "account:" and insert -- account; --, therefor.